(12) United States Patent
Eidam

(10) Patent No.: US 9,930,475 B1
(45) Date of Patent: Mar. 27, 2018

(54) CUSTOMER SERVICE DOCUMENT WITH DATA STORAGE DEVICE

(71) Applicant: Wells Fargo Bank, N.A., San Francisco, CA (US)

(72) Inventor: Kourtney Eidam, Marietta, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 22 days.

(21) Appl. No.: 14/588,542

(22) Filed: Jan. 2, 2015

(51) Int. Cl.
| *H04W 4/00* | (2009.01) |
| *H04W 76/02* | (2009.01) |
| *H04W 12/06* | (2009.01) |
| *G05B 1/01* | (2006.01) |
| *G06K 9/00* | (2006.01) |
| *G06Q 20/00* | (2012.01) |
| *H04B 5/00* | (2006.01) |

(52) U.S. Cl.
CPC .............. *H04W 4/008* (2013.01); *G05B 1/01* (2013.01); *G06K 9/00* (2013.01); *G06Q 20/00* (2013.01); *H04W 12/06* (2013.01); *H04W 76/02* (2013.01); *H04B 5/00* (2013.01)

(58) Field of Classification Search
CPC ..... H04W 4/008; H04W 12/06; H04W 76/02; G06Q 40/00; G06Q 20/36; G06Q 30/0267; G06Q 40/02; G06Q 20/3274; G06Q 20/3276; G06Q 20/3278
See application file for complete search history.

(56) References Cited

U.S. PATENT DOCUMENTS

| 6,918,535 | B1 | 7/2005 | Brosow |
| 7,905,415 | B2 | 3/2011 | Basson et al. |
| 7,974,921 | B1 | 7/2011 | Al Amri |
| 8,756,707 | B2 | 6/2014 | Green |
| 2009/0150294 | A1 | 6/2009 | March et al. |
| 2012/0230577 | A1* | 9/2012 | Calman ................ G06Q 20/042 382/138 |
| 2013/0201000 | A1* | 8/2013 | Solomon .................. G05B 1/01 340/5.83 |
| 2014/0148096 | A1* | 5/2014 | Bhatnagar ............. H04W 4/008 455/41.1 |
| 2014/0361872 | A1* | 12/2014 | Garcia ................. H04B 5/0031 340/5.74 |

FOREIGN PATENT DOCUMENTS

| CN | 203414976 | 1/2014 |
| WO | 2014062623 | 4/2014 |

OTHER PUBLICATIONS

Swedberg, "NDSU Researchers Develop Method for Embedding RFID in Paper," RFID Journal LLC, Feb. 27, 2013.
RFID Banknotes, http://www.fleur-de-coin.com/eurocoins/banknote-rfid, printed on Dec. 31, 2014.

* cited by examiner

*Primary Examiner* — Yuwen Pan
*Assistant Examiner* — Zhitong Chen
(74) *Attorney, Agent, or Firm* — Merchant & Gould P.C.

(57) ABSTRACT

A customer service document with an electrical data storage device is provided to deliver customer service information in a secured manner. The data storage device is attached to the customer service document and configured to contain information to be transferred to a customer's data reading device via short-range communication once the data reading device is authenticated. The transferred information can be used by the data reading device in various applications without identity theft concerns.

14 Claims, 17 Drawing Sheets

CUSTOMER SERVICE DOCUMENT WITH DATA STORAGE DEVICE

BACKGROUND

Financial institutions, such as banks, typically provide financial statements, such as bank statements or account statements, to customers. A financial statement typically contains a summary of financial transactions which have occurred over a given period on an account held by a customer with a financial institution. The financial statement can be printed on one or several pieces of paper and mailed to the customer's address. Although there has been a shift toward paperless, electronic statements, many people still prefer paper statements to online statements for several reasons, such as difficulty in managing overflowing email in-boxes and lack of technical competency.

Financial statements delivered in mail can be exposed to a risk of identity theft when the statements are lost or stolen. Financial statements typically contain personal information, such as a customer's name, address, and account information, which can be fraudulently used by an identity thief.

SUMMARY

In general terms, this disclosure is directed to a customer service document with an electrical data storage device. In one possible configuration and by non-limiting example, the data storage device is attached to the customer service document and configured to contain information to be transferred to a customer's data reading device via short-range communication and used for the customer, thereby providing an extra level of confidentiality and minimizing identity theft risks. Various embodiments are described in this disclosure, which include, but are not limited to, the following aspects.

One aspect is a method of receiving customer service information via a customer service document, the customer service document including an electrical data storage device configured to contain customer service data, the method comprising: establishing short-range communication between a mobile computing device and the data storage device of the customer service document when the mobile computing device is located within a predetermined distance from the customer service document; receiving at least a portion of the customer service data from the data storage device of the customer service document; authenticating the mobile computing device with authentication data, the authentication data included in the customer service data; and performing, using the mobile computing device, a predetermined task using the at least a portion of the customer service data.

Another aspect is a financial document for delivering customer service information to a customer using a mobile computing device, the financial document comprising: an electrical data storage device attached to the financial document, the data storage device configured to contain customer service data readable by the mobile computing device via short-range communication, the customer service data used by the mobile computing device when the mobile computing device is authenticated with authentication data, the authentication data included in the customer service data.

Yet another aspect is a computer-readable data storage medium storing software instructions that, when executed by a mobile computing device, cause the mobile computing device to: establish short-range communication between the mobile computing device and an electrical data storage device attached to a financial document when the mobile computing device is located within a predetermined distance from the financial document; receive, using the mobile computing device, first authentication data from the data storage device of the financial document; retrieve second authentication data from the mobile computing device; compare the first authentication data with the second authentication data; and verify a relationship between the first authentication data and the second authentication data to authenticate the mobile computing device; receive, using the mobile computing device, at least a portion of customer service data from the data storage device of the financial document; and display, using the mobile computing device, customer service information associated with the at least a portion of customer service data.

DETAILED DESCRIPTION

Figure 1:
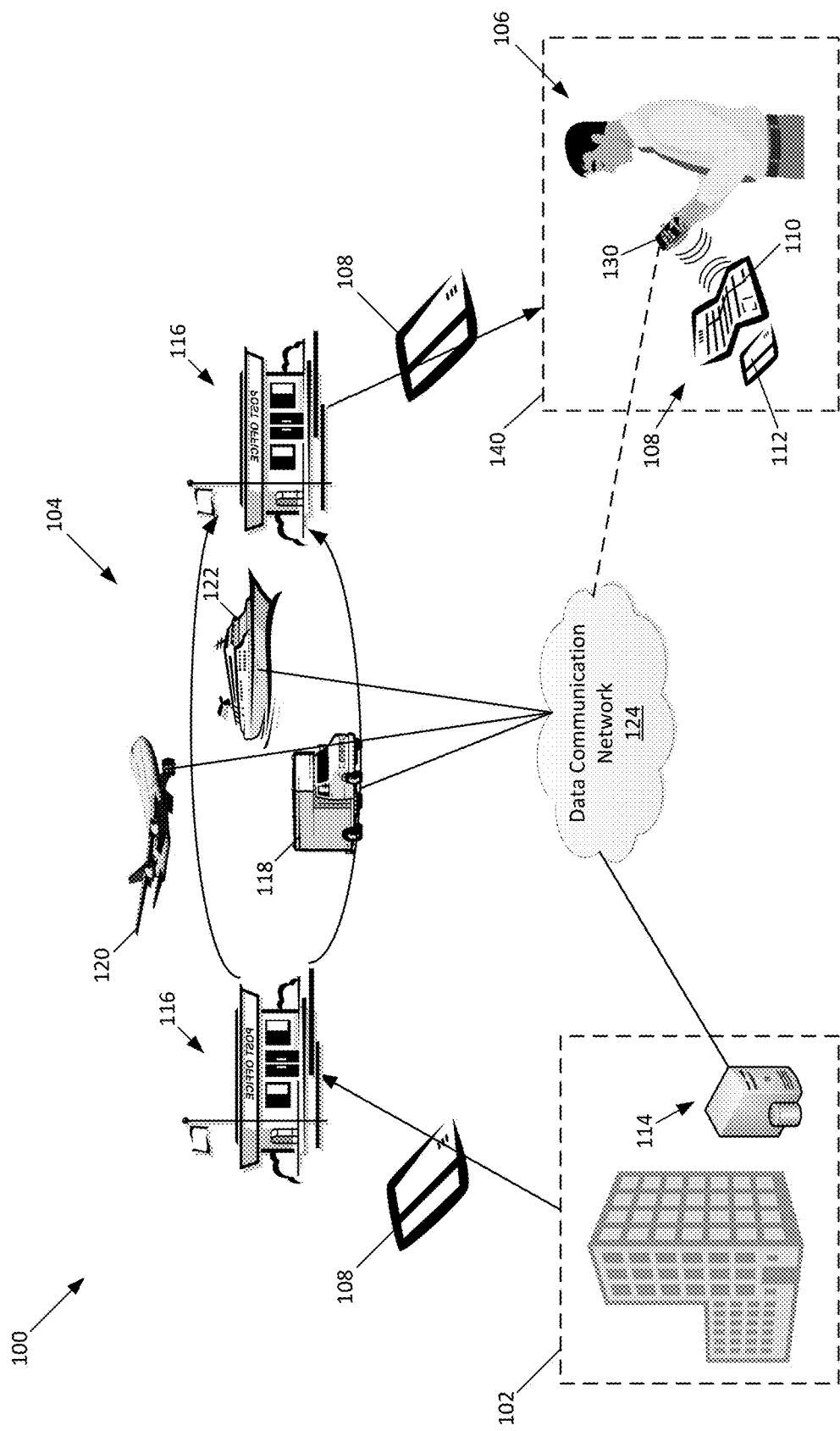
FIG. 1 schematically illustrates a system for delivering customer service information to a customer.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure relates to methods and systems for providing customer service information to a customer, using a customer service document including a data storage device. The data storage device embedded in the customer service document (e.g., a financial document) is configured to contain various types of data.

In some embodiments, the data can be transferred to a data reading device of a customer when the customer service document is delivered to a desired address and the data storage device is in a certain proximity to the customer's data reading device. The data storage device also contains data for verifying that the data reading device is an authorized device. A geolocation data obtained by the data reading device can also be used to authenticate the data reading device. The data reading device then can operate to display the transferred data through an output device (e.g., a display screen) thereof.

Examples of the data include information about a customer, one or more accounts associated with the customer, notices directed to the customer, promotional materials, and/or other types of information. In other embodiments, the data reading device can use the transferred data to activate one or more payment cards that are inactive when the customer service document is delivered with the payment cards. In yet other embodiments, the data transferred from the data storage device can be used for other purposes, such as tracking, arrival verification, and other steps.

As the data storage device contains personal and/or confidential information, the customer service document can show only limited or no information on the paper so that the rest of the information is accessed from the data storage device with the data reading device at the desired address of the customer.

In some embodiments, the customer service document with the data storage device can be delivered to the customer only as a first statement for new customers or new accounts to validate the address on record. Once the address is verified, the customer service document can then launch any subsequent tasks or steps for the customer to complete for future use.

In some embodiments, the data storage device includes a radio frequency identification (RFID) tag or label, and the data reading device includes a RFID-enabled mobile device. In other embodiments, other types of data communication can be used for the data storage device and the data reading device.

The customer service document with the data storage device in accordance with the present disclosure can provide a cost-efficient method of delivering customer service information to the customer without identity theft concerns. Other advantages and functionalities are provided by the present disclosure as well.

FIG. 1 schematically illustrates a system 100 for delivering customer service information to a customer. In some embodiments, the system 100 includes an enterprise 102, a carrier 104, and a customer 106. Also shown is a mailpiece 108 including a customer service document 110 and a container 112.

The enterprise 102 is a company or business that provides various customer services to the customer 106. In some embodiments, the enterprise 102 can have one or more organizations specifically designed to interact with the customer 106. The enterprise 102 can communicate with the customer 106 by mailing the mailpiece 108 to the customer 106.

Some embodiments of the enterprise 102 include a financial institution that provides financial services for the customer 106. For example, the financial institution can include depositary institutions, contractual institutions, and investment institutions. The depositary institutions typically accept and manage deposits from the customer 106 and make loans to the customer 106. Examples of the depository institutions include banks, building societies, credit unions, trust companies, and mortgage loan companies. The contractual institutions can include insurance companies and pension funds. The investment institutions can include investment banks, underwriters, and brokerage firms.

Other embodiments of the enterprise 102 include other types of companies or businesses that provide goods and/or services to the customer 106.

In some embodiments, the enterprise 102 includes and operates a customer service computing device 114. The customer service computing device 114 is designed to manage information about customers, accounts associated with the customers, and other service information. The customer service computing device 114 can include a database management system to provide database services for various purposes as described herein.

The carrier 104 is a person or company that undertakes conveyance of the mailpiece 108 to the customer 106. The carrier 104 can include a plurality of offices, stations, and/or facilities at which mailpieces are received and sorted and from which they are dispatched and distributed. The carrier 104 uses ground transport 118 (e.g., vehicles), air transport 120 (e.g., cargo or passenger aircrafts), and/or ship transport 122 (e.g., cargo or passenger ships). Examples of the carrier 104 include the United States Postal Service, United Parcel Service (UPS), FedEx, and other commercial carriers that provide delivery services.

As described herein, the transport 118, 120, and 122 can communicate with the customer service computing device 114 through data communication network 124 such that the enterprise 102 obtains and manages tracking information of the mailpiece 108 en route from the enterprise 102 and the customer 106. The tracking of the mailpiece 108 can be implemented in various manners known in the art, using the data storage device 146 (e.g., a radio frequency identification (RFID) device) attached to the customer service document 110. This tracking can include verification that the mailpiece 108 has arrived at the desired geolocation, as described herein.

The data communication network 124 communicates digital data between one or more computing devices, such as between the customer service computing device 114 and the data reading device 130, and between the customer service computing device 114 and the data storage device 146. Examples of the network 124 include a local area network and a wide area network, such as the Internet. In some embodiments, the network 124 includes a wireless communication system, a wired communication system, or a combination of wireless and wired communication systems.

A wired communication system can transmit data using electrical or optical signals in various possible embodiments. Wireless communication systems typically transmit signals via electromagnetic waves, such as in the form of optical signals or radio frequency (RF) signals. A wireless communication system typically includes an optical or RF transmitter for transmitting optical or RF signals, and an optical or RF receiver for receiving optical or RF signals. Examples of wireless communication systems include Wi-Fi communication devices (such as utilizing wireless routers or wireless access points), cellular communication devices (such as utilizing one or more cellular base stations), and other wireless communication devices.

The mailpiece 108 is an item sent from the enterprise 102 to the customer 106 by the carrier 104. Examples of the mailpiece 108 include letters, postcards, parcels, packages, and any other items delivered by the carrier 104. In some embodiments, the mailpiece 108 includes the customer service document 110 and the container 112 for containing the customer service document 110 during delivery.

The customer service document 110 is configured to convey customer-related information to the customer 106 who uses a data reading device 130. In some embodiments, the customer service document 110 is delivered as the mailpiece 108 from the enterprise 102 to the customer 106 by the carrier 104. As described herein, the customer service document 110 can electronically store customer-related information and communicate with the customer's data reading device 130 to transfer the information to the data reading device 130. An example structure and operation of the customer service document 110 are illustrated and described with reference to FIG. 2.

The container 112 is configured to contain the customer service document 110 until the customer service document 110 is delivered to the customer 106 and taken out from the container 112. In other embodiments, the mailpiece 108 can be delivered without the container 112. For example, the customer service document 110 can be fold into a self-contained envelope, or can be a postcard or the like without having to be encased in a container.

Referring to FIG. 1, when the mailpiece 108 including the customer service document 110 is delivered to the customer 106 and located within a predetermined distance from the customer's data reading device 130, a data transfer system 140 is established to locally transfer customer-related information from the customer service document 110 to the data reading device 130 operated by the customer 106. An example of the data transfer system 140 is illustrated and described with reference to FIG. 2.

Figure 2:
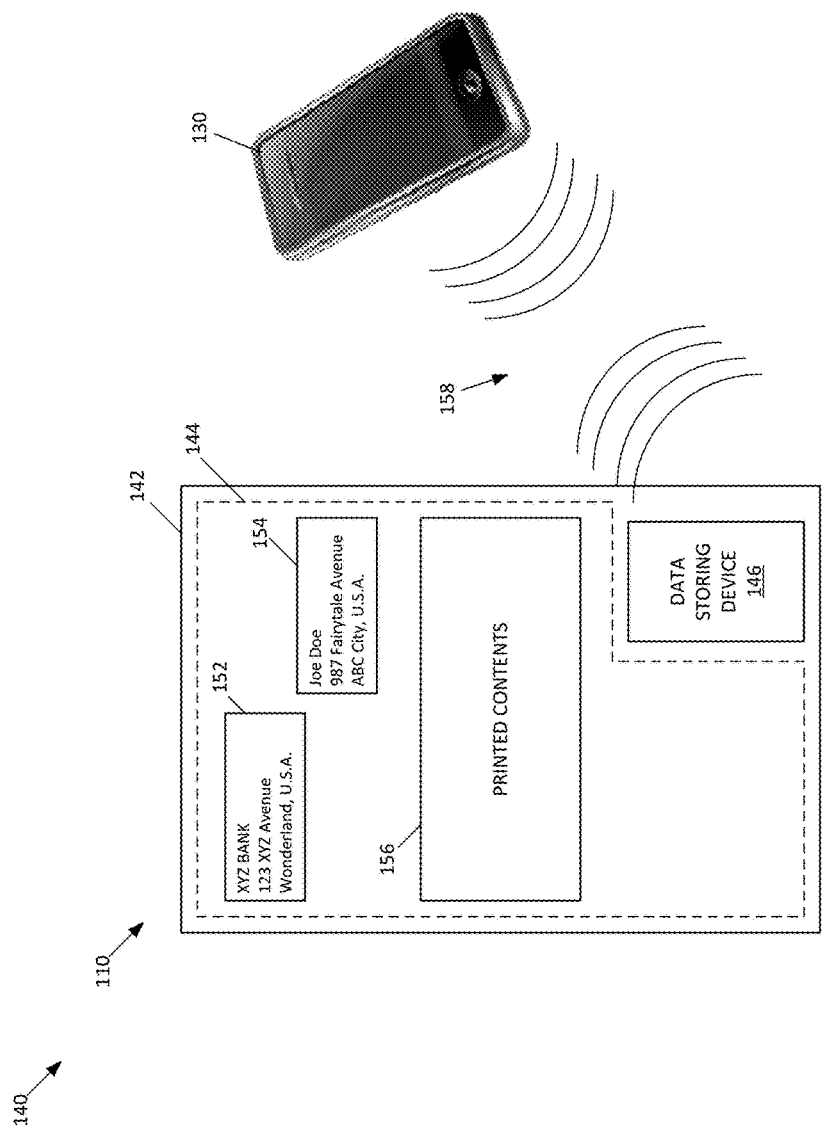
FIG. 2 schematically illustrates an example data transfer system.

FIG. 2 schematically illustrates an example data transfer system 140. In some embodiments, the data transfer system 140 includes the customer service document 110 and the data reading device 130.

The customer service document 110 is designed to convey customer service information to the data reading device 130 operated by the customer 106.

In some embodiments, the customer service document 110 is a financial document. One example of the financial document is a financial statement. The financial statement can contain information about a financial account owned or managed by the customer 106. For example, the financial statement can summarize one or more transactions made during a certain period of time (e.g., a monthly billing cycle), an amount due during the period, and/or spending habits. The financial statement can also contain notices (e.g., changes in fees or interest rates), announcements, tax documents, and/or any type of information regarding the customer's financial account.

In other embodiments, the customer service document 110 is a promotional document or material, such as new financial products or offers. As such, the data storage device 146 can replace inserts or blow-in cards for a separate advertisement.

In yet other embodiments, the customer service document 110 is a letter accompanying an inactive payment card, such as a credit card or a debit card. As described in FIG. 17, the customer service document 110 provides a convenient and secured way to activate accounts and/or payment cards.

In yet a further embodiment, the customer service document 110 can be a legal document associated with a transaction, such as a mortgage document. The customer service document 110 can be used to further enhance security in the exchange of such documents, such as to be used in the systems and methods described in U.S. patent application Ser. No. 14/339,971 filed on Jul. 24, 2014.

Figure 17:
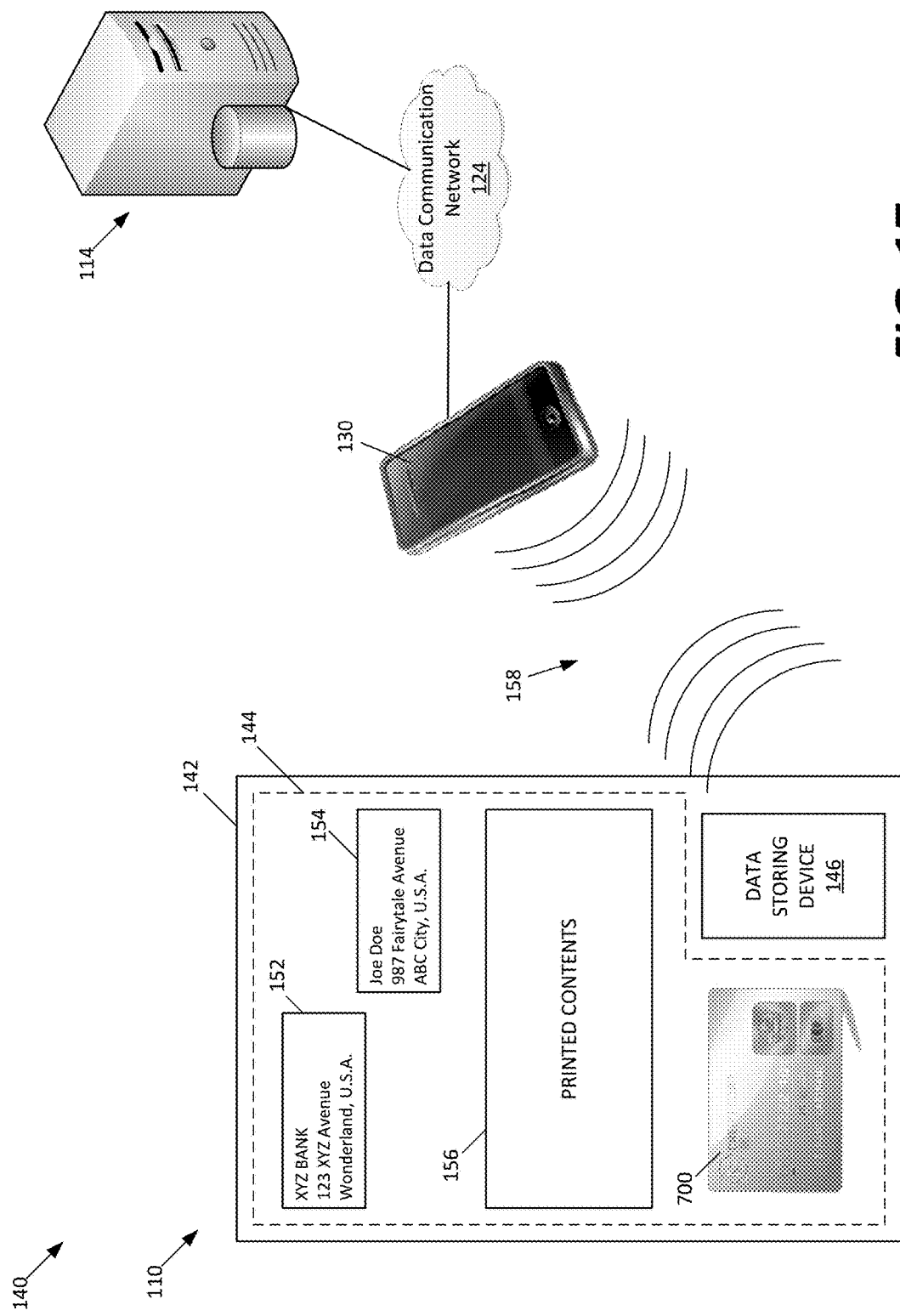
FIG. 17 illustrates another example of the data transfer system.

In yet other embodiments, the customer service document 110 can be a letter notifying an increase in credit limit. For example, the letter of credit limit increase informs the customer 106 of the fact that the customer 106 is eligible for an increased credit limit and provides instructions for enjoying the increased credit limit. The customer service document 110 in this example can be configured and operated similarly to the letter for activating a payment card, as illustrated in FIG. 17.

Referring to FIG. 2, the customer service document 110 can be made with a printable medium 142 that includes a printable area 144 and a data storage device 146.

The printable medium 142 is a medium or material suitable for writing, drawing, and/or printing on. Examples of the printable medium 142 include paper, writable garment, writable plastic, and any other media printable with letters, numbers, and/or designs.

The printable area 144 is an area of the printable medium 142 that is designed for writing, drawing, and/or printing on. In some embodiments, the printable area 144 can be the entire surface of the printable medium 142. In other embodiments, the printable area 144 can be a portion of the printable medium 142.

The printable area 144 can contain various pieces of information. In some embodiments, the printable area 144 can include customer-related information. For example, the printable area 144 is used to print a sender's information 152 (e.g., the enterprise's name and address), a recipient's information 154 (e.g., the customer's name and address), and printed contents 156 directed to the customer 106. The printed contents 156 can include any type of information, such as promotional information and notification from the enterprise 102. In some embodiments, the printed contents 156 do not include personal information, account information, and other sensitive or confidential information. Instead, such information can be contained in the data storage device 146, as described herein.

The data storage device 146 is a device for storing and transmitting data to the data reading device 130 in certain circumstances. In some embodiments, the data storage device 146 can receive, store, and transmit digital information in multiple frequencies. In some embodiments, the data storage device 146 is configured to contain data 236 (FIG. 5) and readable by the data reading device 130 via short-range communication 158. When the customer service document 110 is delivered to the customer 106 and located within a predetermined distance from the data reading device 130, the short-range communication 158 is established between the data storage device 146 and the data reading device 130, and at least some of the data 236 (FIG. 5) stored in the data storage device 146 are ready to be transferred to the data reading device 130.

Once the customer-related information is transferred to the data reading device 130, the data reading device 130 can use the transferred information as necessary. In some embodiments, the data reading device 130 is authenticated either before the information stored in the data storage device 146 is transferred to the data reading device 130 or before the information transferred from the data storage device 146 is used by the data reading device 130. An example of the data 236 stored in the data storage device 146 is illustrated and described in more detail with reference to FIG. 5.

The data storage device 146 is attached to the printable medium 142. In some embodiments, the data storage device 146 is mounted onto a surface of the printable medium 142. In other embodiments, the data storage device 146 is embedded in the printable medium 142 such that the data storage device 146 is invisible from the surfaces of the printable medium 142. For example, the Laser Enabled Advanced Packaging (LEAP) can be used to create thin silicon chips by using a plasma etcher to thin down the chips and a laser beam to insert the data storage device 146 (e.g., the chips and antennas) into the printable medium 142. Other processing methods can also be used to embed the data storage device 146 in the printable medium 142.

An example of the data storage device 146 is illustrated and described in more detail with reference to FIGS. 4-5.

The data reading device 130 operates to communicate with the data storage device 146 of the customer service document 110 and receive data 246 (FIG. 5) from the data storage device 146. In some embodiments, the data reading device 130 can communicate with the customer service computing device 114 to transfer data to the customer service computing device 114 and receive data from the customer service computing device 114. As described herein, the data reading device 130 is configured as a mobile computing device. An example of the data reading device 130 is illustrated and described in more detail with reference to FIGS. 6-8.

Figure 3:
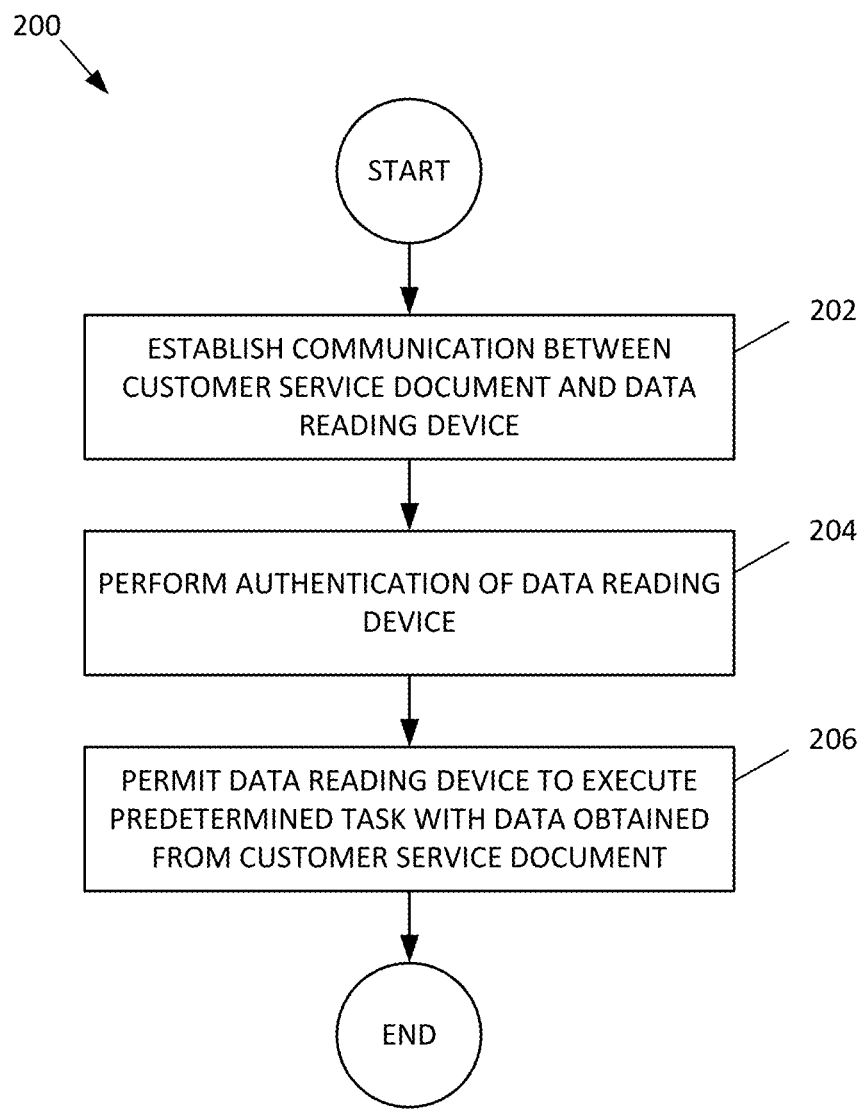
FIG. 3 is a flowchart illustrating an example method of the data transfer system of FIG. 2.

FIG. 3 is a flowchart illustrating an example method 200 of the data transfer system 140 of FIG. 2. In some embodiments, the method 200 includes operations 202, 204, and 206.

At the operation 202, the data transfer system 140 establishes data communication between the customer service document 110 and the data reading device 130. In some embodiments, the data reading device 130 initiates the communication with the customer service document 110. In some embodiments, the data transfer system 140 can use short-range communication between the customer service document 110 and the data reading device 130 to locally perform authorization and data transfer between the customer service document 110 and the data reading device 130. The short-range communication includes radio frequency identification (RFID), near field communication (NFC), Bluetooth, and other wireless communications. Example short-range communications are illustrated in described in more detail with reference to FIG. 7.

At the operation 204, the data transfer system 140 performs authentication of the data reading device 130. In some embodiments, the data reading device 130 is authenticated using authentication data 240 (FIG. 5) stored in the data storage device 146 of the customer service document 110. The authentication data 240 can include information specific to the customer 106 (i.e., customer-specific information, as illustrated in FIG. 5). The data reading device 130 can receive the authentication data 240 from the data storage device 146 via the communication established at the operation 202 before the authentication data 240 is used to authenticate the data reading device 130.

At the operation 206, once the data reading device 130 has been authenticated, the data transfer system 140 permits the data reading device 130 to execute a predetermined task with the data transferred from the customer service document 110 via the established communication. As described herein, in some embodiments, the predetermined task can be to display the data transferred from the customer service document 110 to the data reading device 130. In other embodiments, the predetermined task can be to communicate with the customer service computing device 114 to perform additional tasks, such as activating a payment card delivered along with the customer service document 110.

Figure 4:
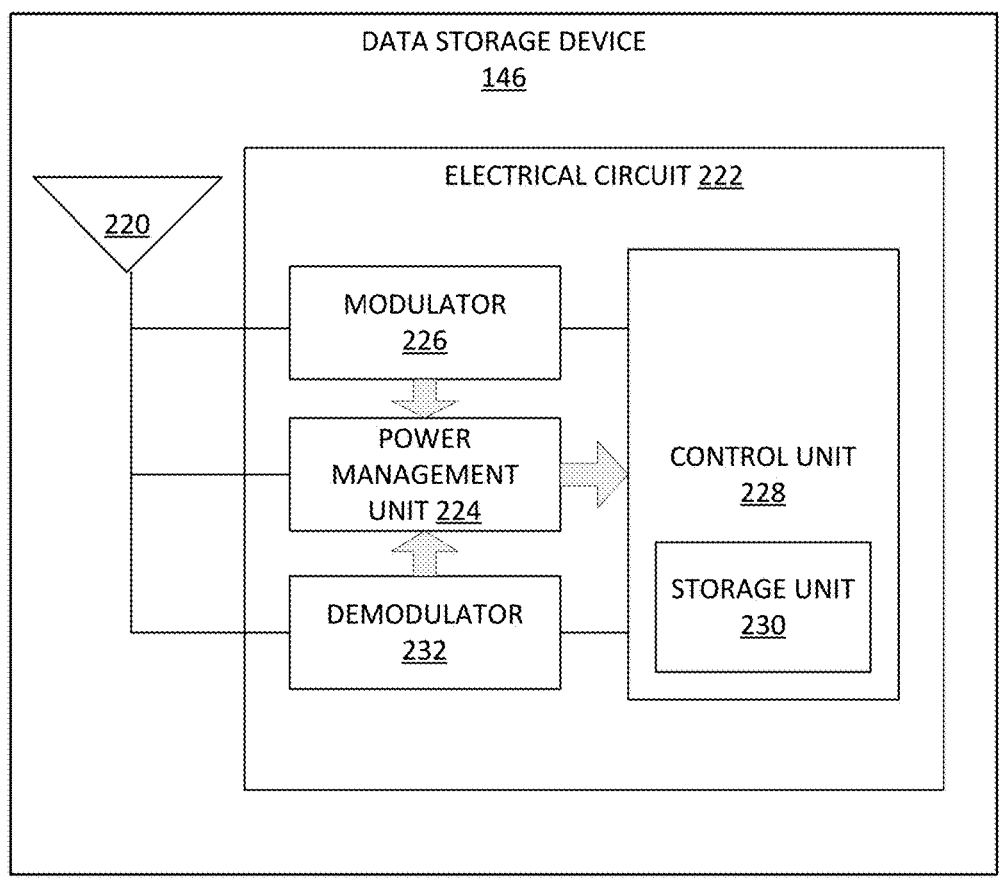
FIG. 4 schematically illustrates an example structure of the data storage device of FIG. 2.

FIG. 4 schematically illustrates an example structure of the data storage device 146 of FIG. 2. In some embodiments, the data storage device 146 operates as a transponder configured to emit an identifying signal in response to an interrogating received signal. In the depicted example, the data storage device 146 is primarily illustrated as a radio frequency identification (RFID) unit. However, in other embodiments, the data storage device 146 can be designed to be in other types of communication, such as near field communication (NFC), Bluetooth, Wi-Fi, and other short-range wireless communications.

The data storage device 146 can be designed as a tag or label suitable to be attached to the customer service document 110. The tag or label can be formed to be substantially flat and thin so as to be easily mounted onto, or embedded into, the customer service document 110. In some embodiments, the data storage device 146 includes an antenna 220 and an electrical circuit 222.

The antenna 220 is configured to receive and transmit a radio frequency (RF) signal. The antenna 220 can be made flat so as to be incorporated into the tag of the data storage device 146. In the illustrated example, the antenna 220 is separate from the electrical circuit 222. In other embodiments, the antenna 220 can be formed on the electrical circuit 222.

The electrical circuit 222 is arranged on the tag of the data storage device 146 and electrically coupled to the antenna 220. In some embodiments, the electrical circuit 222 is implemented in an integrated circuit (IC). In operation, a signal is received by the antenna 220 and communicated to the electrical circuit 222. The electrical circuit 222 operates to harvest power and respond as necessary in response to the incoming signal. In particular, the electrical circuit 222 is configured to store and process information, modulate and demodulate a RF signal, collect power from an associated reader signal, and perform other functions.

In some embodiments, the electrical circuit 222 includes a power management unit (PMU) 224, a demodulator 226, a processing unit 228 including a storage unit 230, and a modulator 232. In other embodiments, the electrical circuit 222 can include one or more components in addition to the components described above, and/or replace one or more of the components described above by different components.

The PMU 224 operates to harvest raw RF power received via the antenna 220. In particular, an RF wave received via the antenna 220 is transmitted to the PMU 224 as a signal. The signal is used for harvesting the power and also decoded for further processes. For example, where the data storage device 146 is implemented as a passive RFID tag, the data storage device 146 does not have its own power source. The data storage device 146 can be powered by electromagnetic induction from magnetic fields produced near a reader of the data storage device 146 (e.g., the data reading device 130). However, it is recognized that the electrical circuit 222 can be powered in different manners. For example, where the data storage device 146 is implemented as an active or semi-passive RFID tag, the data storage device 146 uses internal power source to power the circuit.

The demodulator 226 operates to demodulate an RF signal received via the antenna 220. The demodulator 226 can be implemented in a way known in the art, including, for example, attenuator stage and amplifier stage.

The processing unit 228 operates to receive the demodulated signal from the demodulator 226, perform various operations, and generate an output signal for transmission.

The processing unit 228 can be implemented in a way known in the art, including, for example, a processor, a decoder, and an encoder. The processing unit 228 also includes the storage unit 230.

The storage unit 230 includes one or more memories configured to store data readable by a reader, such as the data reading device 130. The storage unit 230 can be of various types, including volatile and nonvolatile, removable and non-removable, and/or persistent media. In some embodiments, the storage unit 230 is an erasable programmable read only memory (EPROM).

The modulator 232 operates to modulate an output signal generated by the processing unit 228. The modulated signal is transmitted through the antenna 220 to one or more readers, such as the data reading device 130. The modulator 232 can be implemented in a way known in the art, including, for example, driver stage and amplifier stage.

In some embodiments, the demodulator 226 and the modulator 232 may be combined in a single transceiver circuit. In other embodiments, the modulator 232 can include a backscatter transmitter or an active transmitter. In yet other embodiments, the demodulator 226 and the modulator 232 are part of the processing unit 228.

Figure 5:
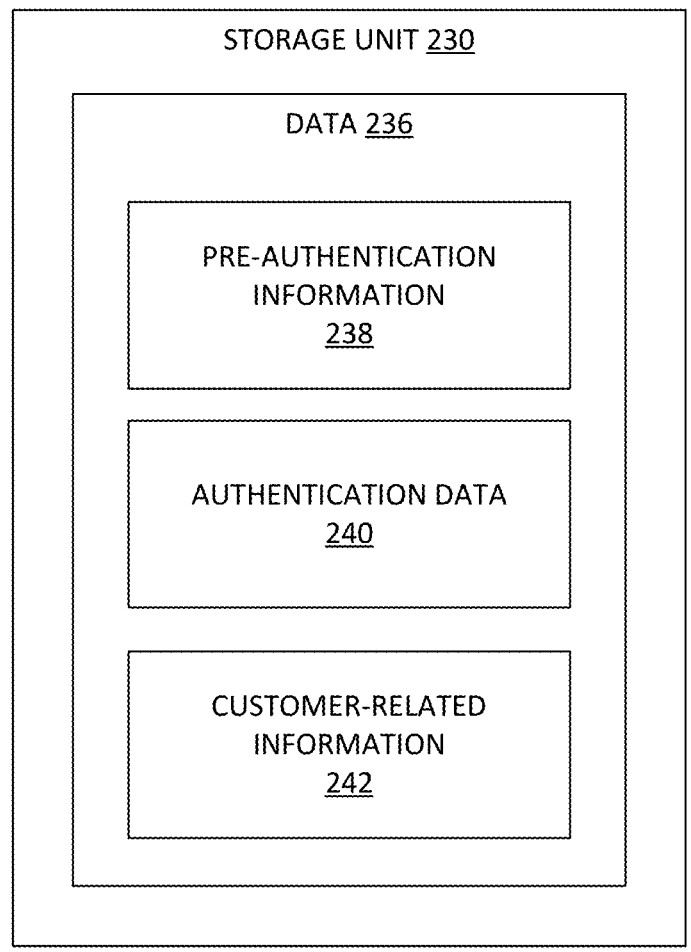
FIG. 5 illustrates example customer service data stored by the data storage device.

FIG. 5 illustrates example customer service data 236 stored by the storage unit 230 of the data storage device 146. The customer service data 236 is readable by the data reading device 130. In some embodiments, the customer service data 236 includes pre-authentication data 238, authentication data 240, and customer-related information 242.

Figure 15:
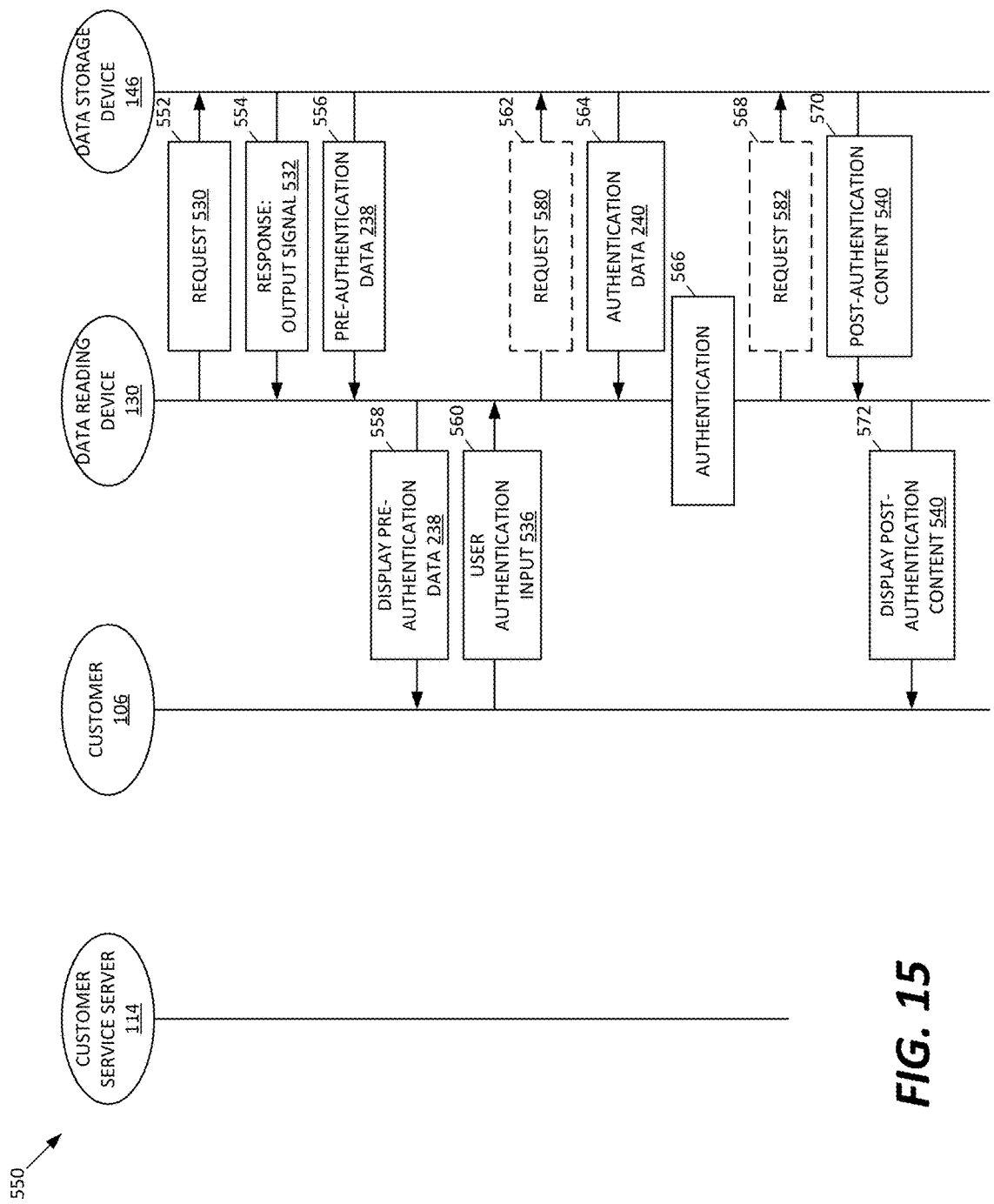
FIG. 15 illustrates another example method of operating the data transfer system.
Figure 16:
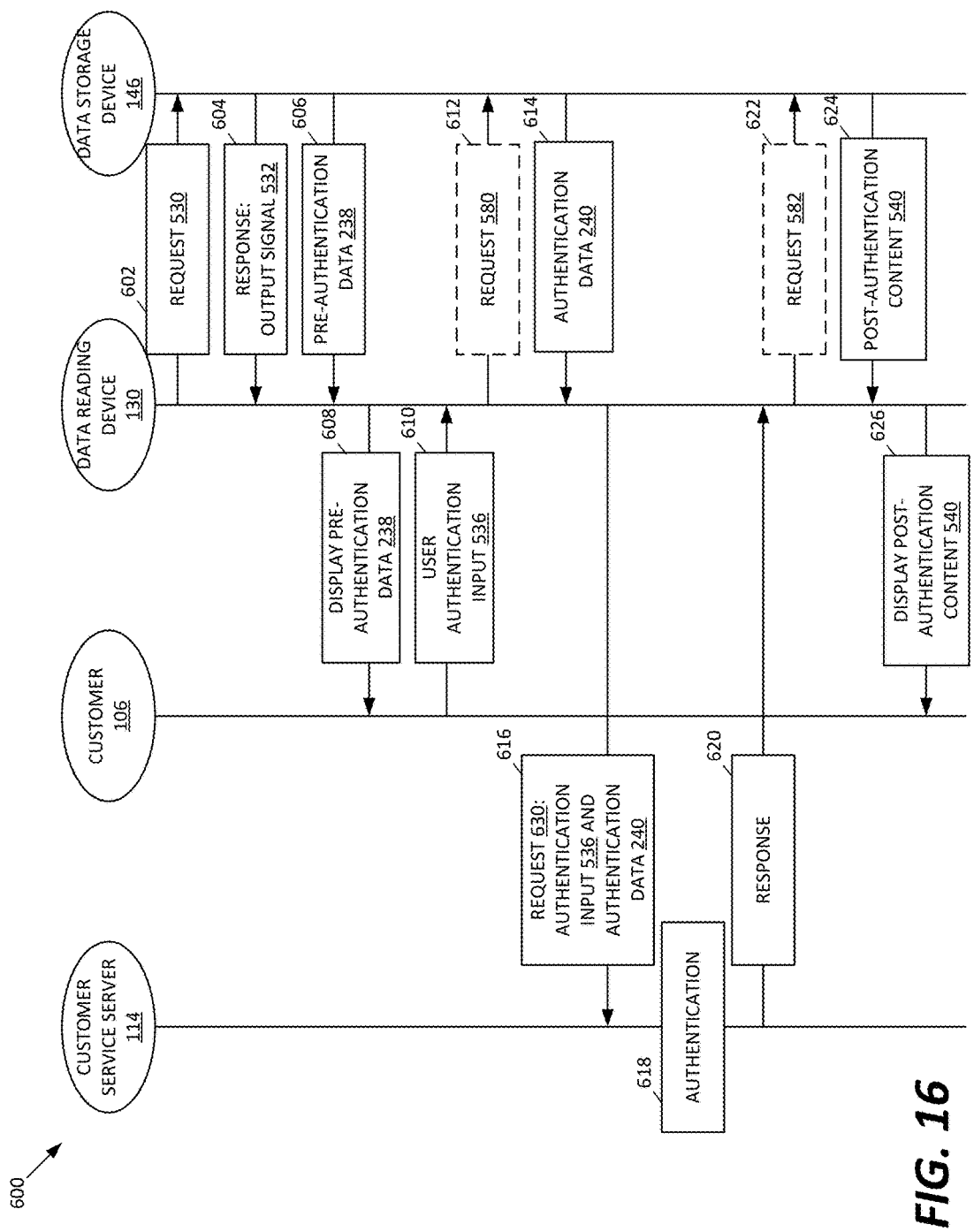
FIG. 16 illustrates yet another example method of operating the data transfer system.

In some embodiments, the data 236 are entirely transferred to the data reading device 130 when the data storage device 146 is located at a predetermined range from the data reading device 130. In other embodiments, the data 236 can be selectively read by the data reading device 130 when the data storage device 146 is placed within the predetermined range from the data reading device 130. For example, the pre-authentication data 238, the authentication data 240, and the customer-related information 242 are sequentially transferred to the data reading device 130 by a series of interaction between the data storage device 146 and the data reading device 130, as illustrated in FIGS. 15 and 16.

The pre-authentication data 238 includes information transferred to the data reading device 130 and used by the data reading device 130 before the data reading device 130 is authenticated. In some embodiments, the data reading device 130 receives and uses the pre-authentication data 238 to provide various materials and/or services to the customer 106 prior to authentication of the data reading device 130.

In some embodiments, the pre-authentication data 238 can be used by the data reading device 130 to generate a push notification. The push notification allows the data reading device 130 (or one or more applications 320 (FIG. 6) or mobile applications executed thereon) to notify the customer 106 of arrival of the customer service document 110 at, for example, the customer's registered home address. In other embodiments, the push notification is used to notify the customer 106 of any other events associated with the customer service document 110 and/or relevant to the customer 106.

In other embodiments, the pre-authentication data 238 can be used by the data reading device 130 to retrieve at least a portion of data stored in the data reading device 130 and display the retrieved data to the customer 106 via a display screen of the data reading device 130. As soon as a wireless communication is established between the data storage device 146 and the data reading device 130 at the customer's premises, the pre-authentication data 238 can be transferred to the data reading device 130 and enable the data reading device 130 (or one or more applications executed thereon) to launch various contents thereon with which the customer 106 interacts. For example, such various contents include a screen pop-up suggesting required actions and provide clickable buttons for accepting, declining, asking for reminder, etc. for the required actions. Further, the pre-authentication data 238 can be used to prompt the data reading device 130 to give the customer 106 an instruction on how to authenticate the data reading device 130 (e.g., a how-to or introduction video). The instruction can be of various types, such as written format, video format, and/or audio format.

In yet other embodiments, when receiving the pre-authentication data 238, the data reading device 130 can display at least a portion of the data 238 via a display screen of the device 130.

The authentication data 240 is used to authenticate the data reading device 130 when the authentication data 240 is transferred from the data storage device 146 to the data reading device 130 via short-range communication therebetween. As described herein, the authentication data 240 obtained from the data storage device 146 can be compared with reference authentication data 490 (FIG. 13) retrieved from the data reading device 130 to verify a relationship therebetween (e.g., whether the authentication data 240 matches the reference authentication data 490).

In some embodiments, the authentication data 240 include customer-specific information, which is information specific to the customer 106. Examples of the customer-specific information include a customer's name, a customer's address, a customer's social security number, a customer login information (e.g., a customer-set ID, a customer-set password, and a customer-set security code), and one or more identifiers (e.g., serial number, model name, and product identification number) of the mobile computing device 160. When used in authentication process, the authentication data 240 can consist of at least one of different pieces of the customer-specific information.

The customer-related information 242 includes any information or data associated with the customer 106 and used by the data reading device 130 for customer service or benefit once the data reading device 130 have been authenticated. The customer-related information 242 can include any information or data suitable for desired purposes. In some embodiments, the customer-related information 242 is a command or code used by the data reading device 130 to retrieve customer service information and utilize (e.g., display) it for the customer 106. In other embodiments, the customer-related information 242 contains customer service information to be transferred to the data reading device 130 and displayed therethrough.

In examples where the customer service document 110 is a financial statement, the customer-related information 242 can include information about the customer 106 and a financial account owned or managed by the customer 106. The information about the customer 106 includes personal information such as the customer's name, address, biographical information, social security number, and other private or sensitive information. The information about a financial account can summarize one or more transactions made during a certain period of time (e.g., a monthly billing cycle) and an amount due during the period. The financial statement can also contain notice, announcement, tax documents, and/or any type of information regarding the customer's financial account.

In examples where the customer service document 110 is a promotional material, the customer-related information 242 can include any type of information for raising customer awareness of products, services, and brand of the enterprise 102, and/or for achieving sales increases, new product or service acceptance, creation of brand equity, positioning, competitive retaliations, or creation of a corporate image. The customer-related information 242 for promotional purposes can also include information about new products or services, special offers, coupons, customer satisfactory surveys, and other contents for promotional purposes.

In examples where the customer service document 110 is a letter for delivering a payment card (e.g., a new credit card or debit card) that is inactive, the customer-related information 242 can include an activation command configured to be sent to the customer service computing device 114 of the enterprise 102 so that the customer service computing device 114 completes the activation of the payment card. For example, the customer-related information 242 for activation processes can include information about the customer 106, a financial account associated with the payment card, and other information identifying the payment card and the customer 106, such as account number, social security number, serial number on the back, telephone, and zip code. An example operation of the customer service document 110 used for activating a payment card is illustrated and described in more detail with reference to FIG. 17.

Figure 6:
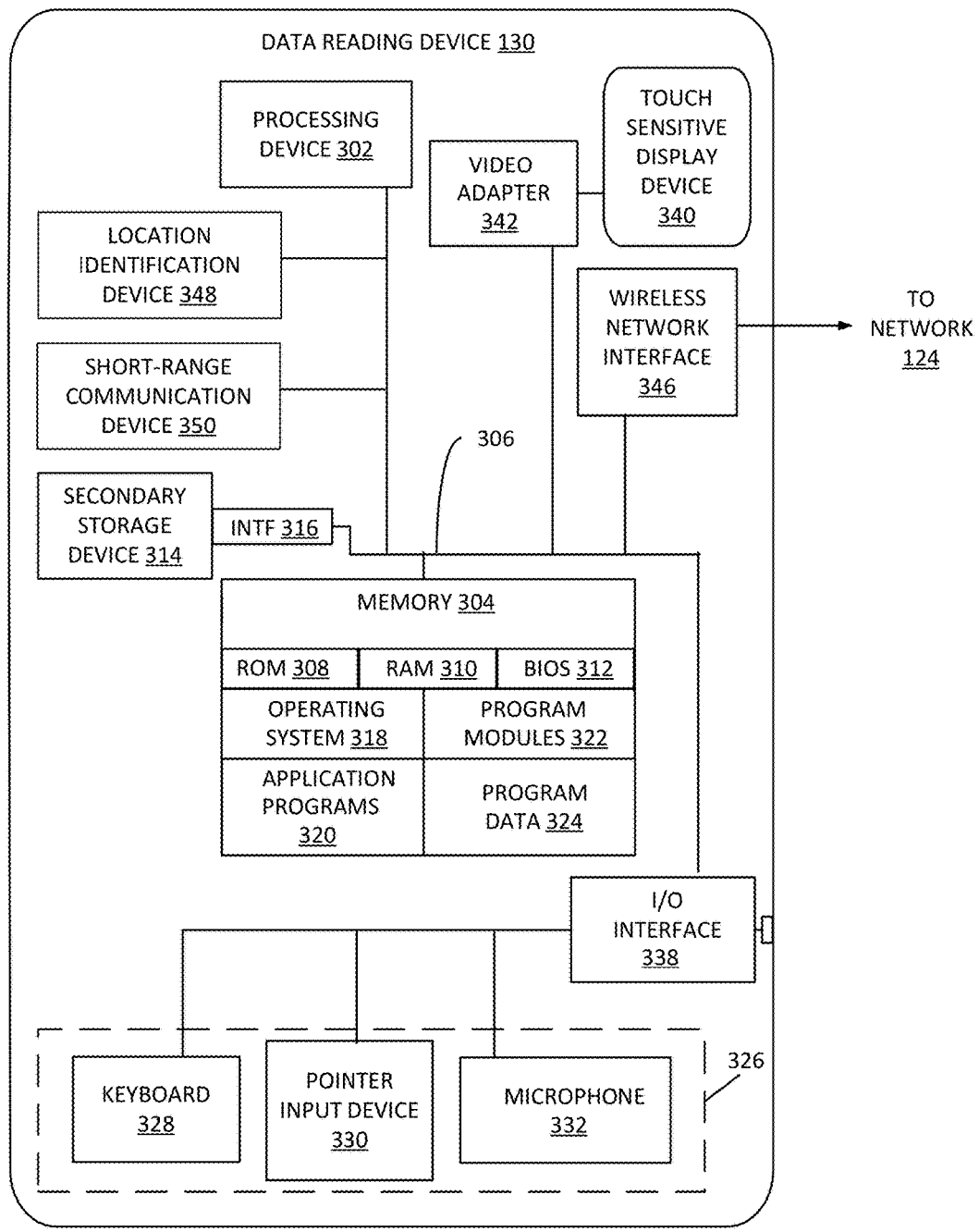
FIG. 6 illustrates an exemplary architecture of a data reading device.

FIG. 6 illustrates an exemplary architecture of the data reading device 130. The data reading device 130 illustrated in FIG. 6 is used to execute the operating system, application programs, and software modules (including the software engines) described herein.

The data reading device 130 is a computing device of various types. In some embodiments, the data reading device 130 is a mobile computing device. Examples of the data reading device 130 as a mobile computing device include a mobile device (e.g., a smart phone and a tablet computer), a wearable computer (e.g., a smartwatch and a head-mounted display), a personal digital assistant (PDA), a handheld game console, a portable media player, a ultra-mobile PC, a digital still camera, a digital video camera, and other mobile devices. In other embodiments, the data reading device 130 is other computing devices, such as a desktop computer, a laptop computer, or other devices configured to process digital instructions.

It is recognized that the architecture illustrated in FIG. 6 can also be implemented in other computing devices used to achieve aspects of the present disclosure. For example, the customer service computing device 114 can be configured similarly to the architecture of FIG. 6. To avoid undue repetition, this description of the data reading device 130 will not be separately repeated herein for each of the other computing devices including the customer service computing device 114.

The data reading device 130 includes, in some embodiments, at least one processing device 302, such as a central processing unit (CPU). A variety of processing devices are available from a variety of manufacturers, for example, Intel or Advanced Micro Devices. In this example, the data reading device 130 also includes a system memory 304, and a system bus 306 that couples various system components including the system memory 304 to the processing device 302. The system bus 306 is one of any number of types of bus structures including a memory bus, or memory controller; a peripheral bus; and a local bus using any of a variety of bus architectures.

The system memory 304 includes read only memory 308 and random access memory 310. A basic input/output system 312 containing the basic routines that act to transfer information within the data reading device 130, such as during start up, is typically stored in the read only memory 308.

The data reading device 130 also includes a secondary storage device 314 in some embodiments, such as a hard disk drive, for storing digital data. The secondary storage device 314 is connected to the system bus 306 by a secondary storage interface 316. The secondary storage devices and their associated computer readable media provide nonvolatile storage of computer readable instructions (including application programs and program modules), data structures, and other data for the data reading device 130.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 314 or memory 304, including an operating system 318, one or more application programs 320, other program modules 322, and program data 324.

In some embodiments, the data reading device 130 includes input devices to enable a user to provide inputs to the data reading device 130. Examples of input devices 326 include a keyboard 328, a pointer input device 330, a microphone 332, and a touch sensitive display 340. Other embodiments include other input devices. The input devices are often connected to the processing device 302 through an input/output interface 338 that is coupled to the system bus 306. These input devices 326 can be connected by any number of input/output interfaces, such as a parallel port, serial port, game port, or a universal serial bus. Wireless communication between input devices and interface 338 is possible as well, and includes infrared, BLUETOOTH® wireless technology, 802.11a/b/g/n, cellular, or other radio frequency communication systems in some possible embodiments.

In this example embodiment, a touch sensitive display device 340 is also connected to the system bus 306 via an interface, such as a video adapter 342. The touch sensitive display device 340 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 340, the data reading device 130 can include various other peripheral devices (not shown), such as speakers or a printer.

When used in a local area networking environment or a wide area networking environment (such as the Internet), the data reading device 130 is typically connected to the network through a network interface, such as a wireless network interface 346. Other possible embodiments use other communication devices. For example, some embodiments of the data reading device 130 include an Ethernet network interface, or a modem for communicating across the network.

The data reading device 130 typically includes at least some form of computer-readable media. Computer readable media includes any available media that can be accessed by the data reading device 130. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the data reading device 130. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 6 is also an example of programmable electronics, which may include one or more such computing devices, and when multiple computing devices are included, such computing devices can be coupled together with a suitable data communication network so as to collectively perform the various functions, methods, or operations disclosed herein.

Referring again to FIG. 6, the data reading device 130 can include a location identification device 348. The location identification device 348 is configured to identify the location or geolocation of the data reading device 130. The location identification device 348 can use various types of geolocating or positioning systems, such as network-based systems, handset-based systems, SIM-based systems, Wi-Fi positioning systems, and hybrid positioning systems. Network-based systems utilize service provider's network infrastructure, such as cell tower triangulation. Handset-based systems typically use the Global Positioning System (GPS). Wi-Fi positioning systems can be used when GPS is inadequate due to various causes including multipath and signal blockage indoors. Hybrid positioning systems use a combination of network-based and handset-based technologies for location determination, such as Assisted GPS.

Referring again to FIG. 6, the data reading device 130 further includes a short-range wireless communication device 350. The short-range wireless communication device 350 is configured to establish short-range wireless communication with the data storage device 146 of the customer service document 110. Short-range wireless communication is one-way or two-way short-range to medium-range wireless communication. Short-range wireless communication can be established according to various technologies and protocols. Examples of short-range wireless communication include a radio frequency identification (RFID), a near field communication (NFC), a Bluetooth technology, and a Wi-Fi technology. Example communications established by the short-range wireless communication device 350 are illustrated and described in more detail with reference to FIG. 7.

Figure 7:
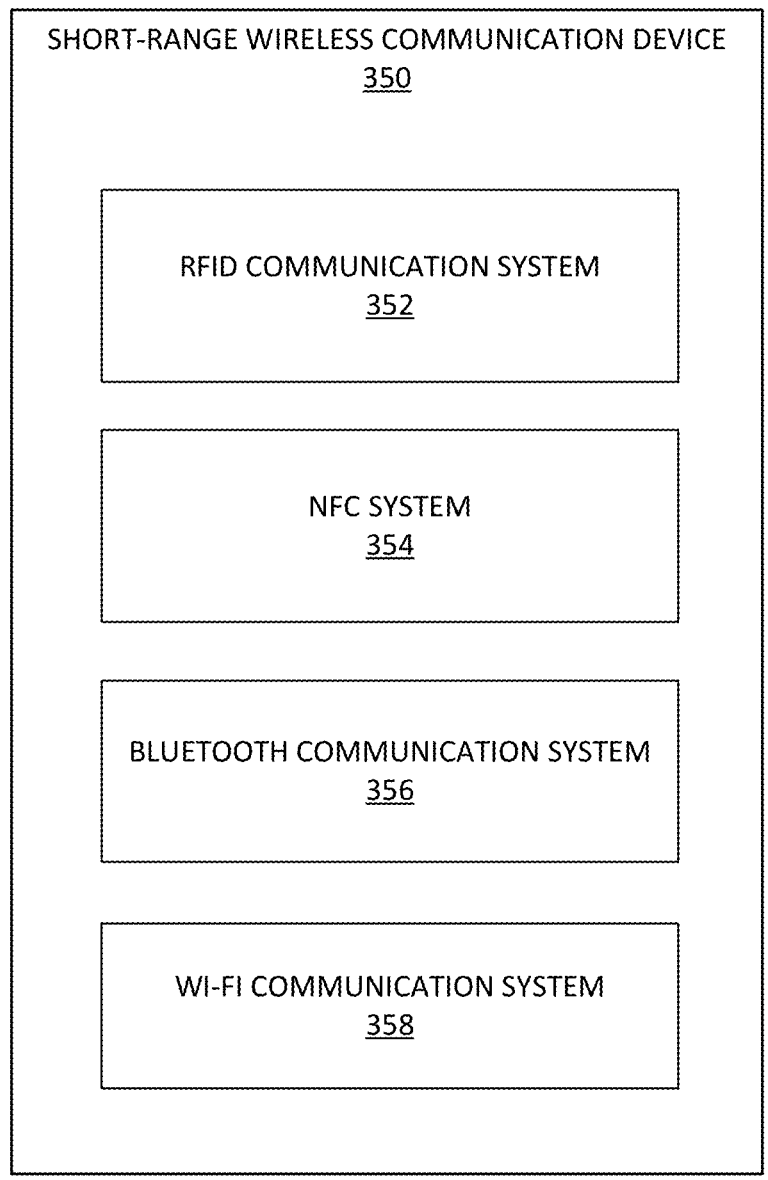
FIG. 7 illustrates example communication protocols that can be implemented by a short-range wireless communication device of FIG. 6.

FIG. 7 illustrates example communication protocols that can be implemented by the short-range wireless communication device 350 of FIG. 6. In some embodiments, the short-range wireless communication device 350 includes at least one of a radio frequency identification (RFID) communication system 352, a near field communication (NFC) system 354, a Bluetooth communication system 356, and a Wi-Fi communication system 358.

The RFID communication system 352 is configured to enable the data reading device 130 to function as an active RFID reader and communicate with the data storage device 134 of the customer service document 110. In this example, the data storage device 134 is correspondingly configured as a RFID device (e.g., a RFID tag). As described herein, when the data reading device 130 is brought close enough to the data storage device 134 attached to the customer service document 110, a short-range RF communication can be established between the data reading device 130 and the data storage device 146 via electromagnetic fields so that query, authorization/authentication, and/or data interchange processes are performed between the data reading device 130 and the data storage device 146.

The NFC system 354 is configured to enable the data reading device 130 to establish radio communication with the data storage device 146 by touching the data storage device 146 and the data reading device 130 or bring them into proximity. The NFC system 354 can be configured in a way known in the art. The data storage device 146 is correspondingly configured to communicate with the NFC system 354. In some embodiments, the NFC system 354 acts as an NFC reader and the data storage device 146 functions as an NFC tag.

The Bluetooth communication system 356 is configured to establish Bluetooth wireless connection with the data storage device 146 and other communications modules. The Bluetooth communication system 356 can be configured in a way known in the art. The data storage device 146 is also configured to be capable of establish Bluetooth communication with the data reading device 130. The Bluetooth communication system 356 and the data storage device 146 are correspondingly configured to transmit data via low-power radio waves.

The Wi-Fi communication system 358 is configured to establish Wi-Fi connection with the data storage device 146 and other communication modules. The Wi-Fi communication system 358 can be designed in a way known in the art. The data storage device 146 is also configured to communicate with the Wi-Fi communication system 358. The Wi-Fi communication system 358 and the data storage device 146 are correspondingly configured to transmit data via radio waves. By way of non-limiting example, and as will be appreciated by those skilled in the relevant arts, Wi-Fi can be deployed in accordance with IEEE 802.11 (Wireless LAN), IEEE 802.15.4 (Low-Rate wireless PAN, such as ZigBee, WirelessHART, and MiWi), IEEE 802.22 (Wireless Regional Area Network), or other standard. In some embodiments, Wi-Fi connection can be alternatively established if other connections (e.g., RFID, NFC, and Bluetooth) are not established.

In other embodiments, the short-range wireless communication device 350 can implement other types of short-range communications, such as infrared data communication, Z-Wave, ANT+, and other suitable protocols.

Figure 8:
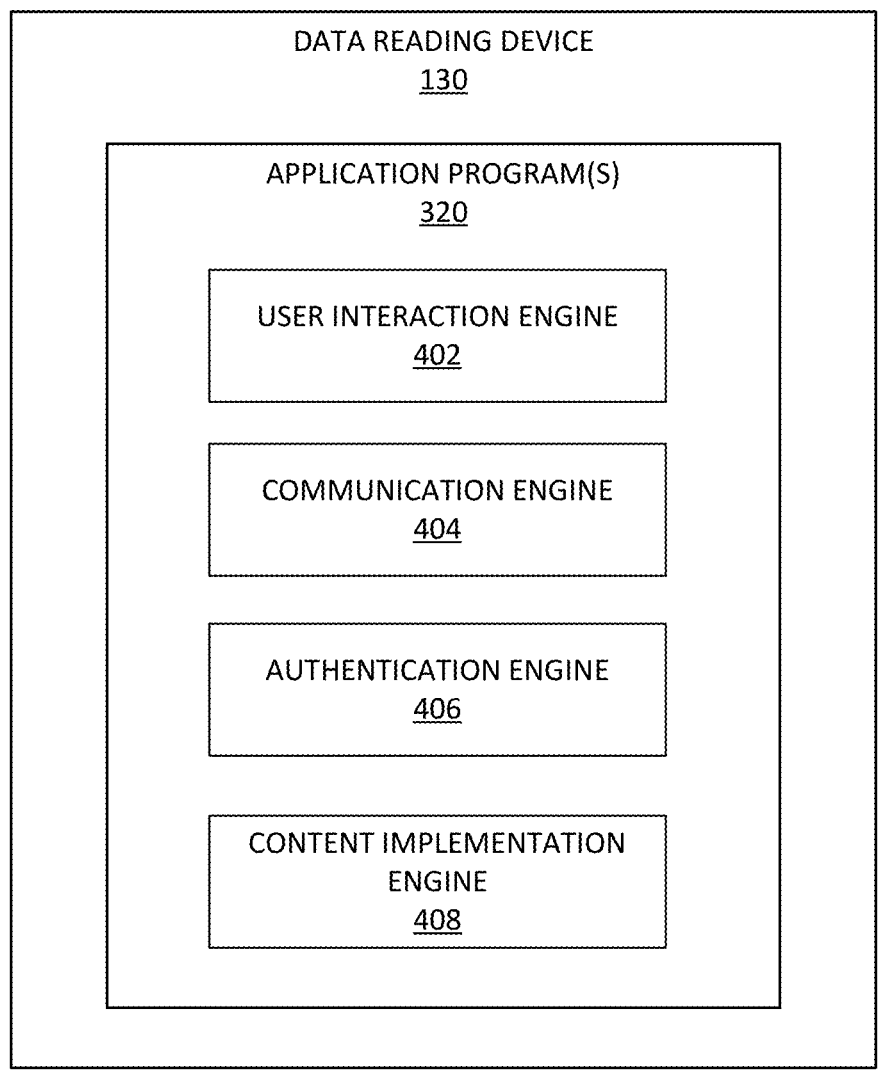
FIG. 8 is a block diagram illustrating example functions performed in the data reading device.

FIG. 8 is a block diagram illustrating example functions that can be performed in the data reading device 130. The functions can be implemented by the application program 320 as illustrated in FIG. 6, which are executed in the data reading device 130. In some embodiments, the application program 320 executed in the data reading device 130 can be a stand-alone software application (e.g., a mobile application) designed for interacting with the data storage device 146. In other embodiments, the application program 320 can be incorporated with another software application that performs other functions (e.g., an online banking mobile application designed to perform various online banking tasks)

In some embodiments, the data reading device 130 includes a user interaction engine 402, a communication engine 404, an authentication engine 406, and a content implementation engine 408.

The user interaction engine 402 operates as an interface for the customer 106 to interact with the data reading device 130. In some embodiments, the user interaction engine 402 displays a graphical user interface on a display screen of the data reading device 130. The user interaction engine 402 operates to display information or data to the customer 106 via a display screen of the data reading device 130. Further, the user interaction engine 402 operates to receive authentication input from the customer 106. For example, the customer 106 can enter authentication input via the interface displayed on the display screen of the data reading device 130.

The communication engine 404 operates to establish short-range wireless connection between the data storage device 146 and the data reading device 130. An example operation of the communication engine 404 is illustrated and described in more detail with reference to FIG. 9.

The authentication engine 406 operates to authenticate the data reading device 130 with authentication data obtained from the data storage device 146. An example operation of the authentication engine 406 is illustrated and described in more detail with reference to FIG. 10.

The content implementation engine 408 operates to utilize data (e.g., the customer-related information 242) and perform one or more predetermined tasks once the data reading device 130 has been authenticated. In some embodiments, the content implementation engine 408 operates to display the customer-related information 242, which is transferred from the data storage device 146 of the customer service document 110. As described herein, the customer-related information 242 can include information about a customer's financial account, and promotional information directed to the customer 106. In other embodiments, the content implementation engine 408 can send activation information to the customer service computing device 114 so that the customer service computing device 114 activates a payment card delivered with the customer service document 110 to the customer 106. In yet other embodiments, the content implementation engine 408 can perform different tasks, using the data transferred from the data storage device 146. Example operations of the content implementation engine 408 are illustrated and described in more detail with reference to FIGS. 14-16.

Figure 9:
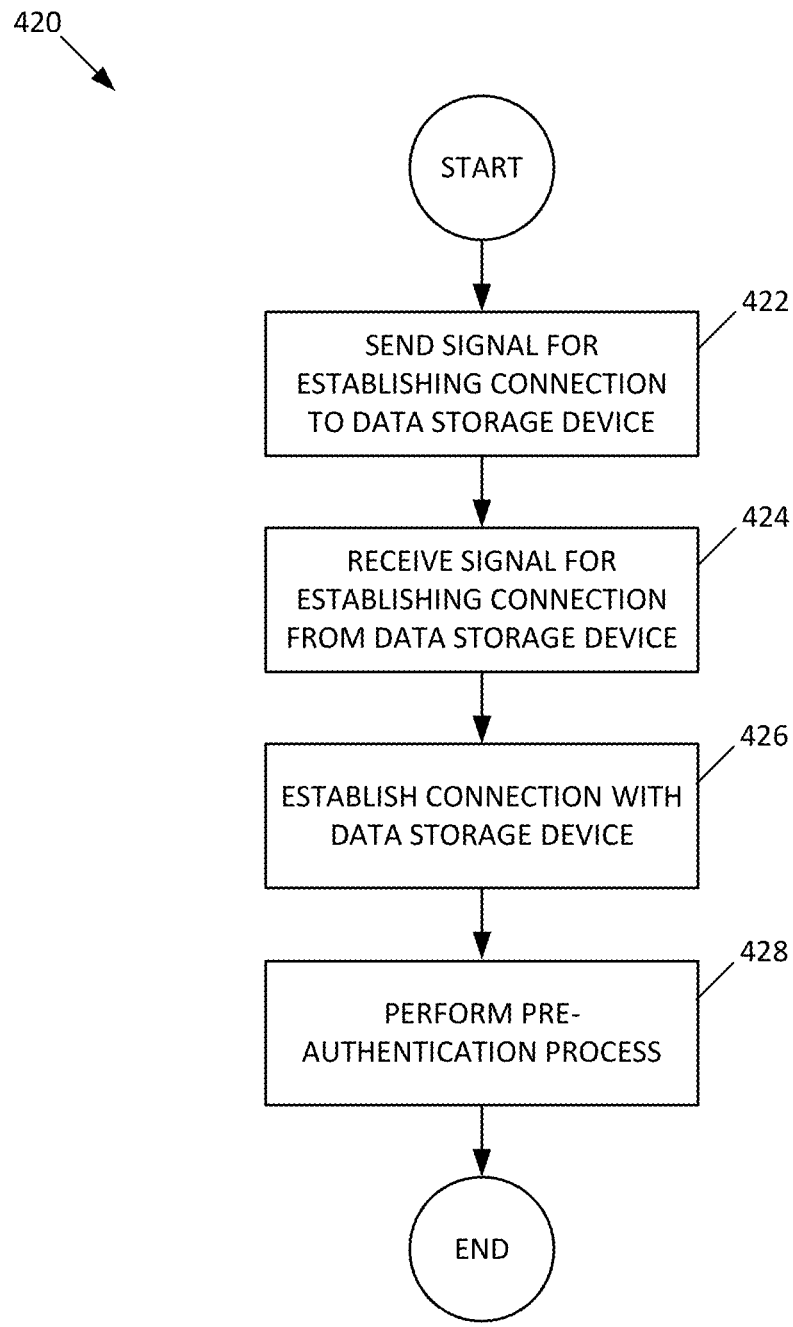
FIG. 9 is a flowchart illustrating an example method of operating a communication engine of the data reading device.

FIG. 9 is a flowchart illustrating an example method 420 of operating the communication engine 404 of the data reading device 130. In some embodiments, the method 420 includes operations 422, 424, 426, and 428. The method 420 includes operations that are performed by one or more processors, such as the processing device 302 as illustrated in FIG. 6.

At the operation 422, the data reading device 130 (e.g., the communication engine 404) operates to send a signal to the data storage device 146 to establish wireless connection therebetween. In some embodiments, the data reading device 130 generates magnetic fields. In some examples where the data storage device 146 does not have its own power source, the magnetic fields can cause electromagnetic induction and thus power the data storage device 146 when the customer service document 110 including the data storage device 146 is located within the magnetic fields. In response, the data storage device 146 operates to generate an output signal for establishing wireless connection between the data storage device 146 and the data reading device 130. In some embodiments, the output signal can also convey other data (e.g., the pre-authentication data 238, the authentication data 240, and/or the customer-related information 242).

At the operation 424, the data reading device 130 (e.g., the communication engine 404) operates to receive the output signal from the data storage device 146.

At the operation 426, the data reading device 130 (e.g., the communication engine 404) operates to establish wireless connection between the data reading device 130 and the data storage device 146.

At the operation 428, the data reading device 130 (e.g., the communication engine 404) can optionally perform one or more pre-authentication processes. The pre-authentication processes can use the pre-authentication data 238 transferred from the data storage device 146. Examples of the pre-authentication processes include a process of retrieving and displaying data stored in the data reading device 130, a process of accessing one or more resources of the data reading device 130, a process of generating a push notification, a process of displaying at least some of the pre-authentication data 238, and other processes that are executed prior to authentication of the data reading device 130.

Figure 10:
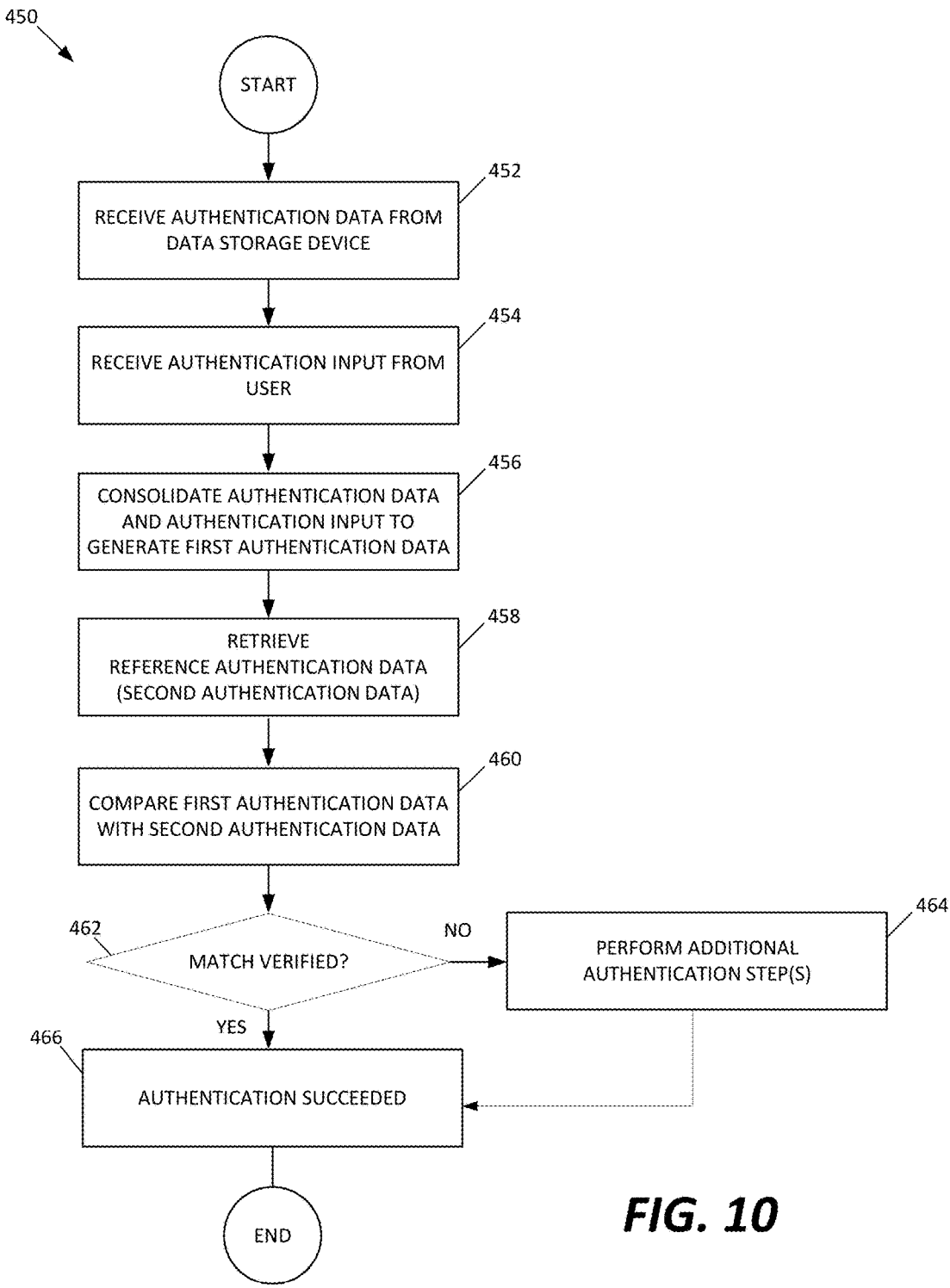
FIG. 10 is a flowchart illustrating an example method of operating an authentication engine of the data reading device.

FIG. 10 is a flowchart illustrating an example method 450 of operating the authentication engine 406 of the data reading device 130. In some embodiments, the method 450 includes operations 452, 454, 456, 458, 460, 462, 464, and 466. The method 450 includes operations that are performed by one or more processors, such as the processing device 302 as illustrated in FIG. 6.

At the operation 452, the data reading device 130 (e.g., the authentication engine 406) operates to receive authentication data 240 (FIG. 5) from the data storage device 146 of the customer service document 110 when the data reading device 130 establishes wireless connection with the data storage device 146, as described above.

At the operation 454, the data reading device 130 (e.g., the authentication engine 406) operates to receive authentication input 480 (FIG. 12) from the customer 106. In some embodiments, the user interaction engine 402 operates to receive authentication input 480 from the customer 106 by prompting the customer 106 to enter authentication input 480 via an interface provided by the data reading device 130.

In some embodiments, the authentication input 480 includes customer-identification information. For example, the customer-identification information can include a user- ID and a user password, which have been preset either by the customer 106 or by the enterprise 102. In other embodiments, the authentication input 480 includes other personal and/or service-related information, such as the customer's date of birth, the customer's social security number or tax identification number, the customer's account number, the customer's credit/debit card number, the customer's contact information (e.g., address, phone number, and email address), and any other information suitable for identifying the customer 106. An example of the authentication input 480 is illustrated and described in more detail with reference to FIG. 12.

In some embodiments, the operation 454 is optional. The data reading device 130 (e.g., the authentication engine 406) can only rely on the authentication data 240 received from the data storage device 146 for authenticating the data reading device 130. As described below, where the operation 454 is optional, the operation 456 can also be eliminated from the method 450.

At the operation 456, the data reading device 130 (e.g., the authentication engine 406) operates to consolidate the authentication data 240 and the user authentication input 480. The combination of the authentication data 240 and the user authentication input 480 can be referred to as a first authentication data and used in at least some of the subsequent operations.

At the operation 458, the data reading device 130 (e.g., the authentication engine 406) operates to retrieve reference authentication data 490 (FIG. 13), which is also referred to herein as a second authentication data. In some embodiments, the reference authentication data 490 can be locally stored in the data reading device 130, and therefore retrieved from the data reading device 130. In other embodiments, the reference authentication data 490 are managed by an authentication server (e.g., the customer service computing device 114). In this configuration, the data reading device 130 operates to receive the reference authentication data 490 from the authentication server via the data communication network 124. An example of the reference authentication data 490 is illustrated and described in more detail with reference to FIG. 13.

At the operation 460, the data reading device 130 (e.g., the authentication engine 406) operates to compare the first authentication data (i.e., the combination of the authentication data 240 and the user authentication input 480) with the second authentication data (i.e., the reference authentication data 490).

In some embodiments, all items contained in the first authentication data and the second authentication data can be used for comparison. In other embodiments, only some of the items contained in the first authentication data are selected, and the corresponding items are only selected from the second authentication data to be compared with the selected items from the first authentication data.

At the operation 462, the data reading device 130 (e.g., the authentication engine 406) operates to verify a relationship between the first authentication data and the second authentication data. If it is determined that the first authentication data does not match the second authentication data ("NO" at the operation 462), the method 450 continues on to the operation 464. If it is determined that the first authentication data matches the second authentication data ("YES" at the operation 462), the method 450 continues on to the operation 466.

At the operation 464, the data reading device 130 (e.g., the authentication engine 406) operates to perform one or more additional authentication processes. In some embodiments, the data reading device 130 can request the customer 106 to verify the authentication input 480 provided by the customer 106, and/or to enter additional or alternative information via an interface of the data reading device 130. In other embodiments, the data reading device 130 sends a request to the authentication server (e.g., the customer service computing device 114) so that the authentication servicer performs additional authentication as necessary.

At the operation 466, once it is verified that the first authentication data matches the second authentication data, the data reading device 130 is considered to have been successfully authenticated, and ready for subsequent processes, such as processes performed by the content implementation engine 408.

Although it is illustrated that the user authentication input 480 is combined with the authentication data 240 to be compared with the reference authentication data 490, it is also possible to combine the user authentication input 480 with the reference authentication data 490 and compare the combination with the authentication data 240 for verifying a relationship therebetween.

Figure 11:
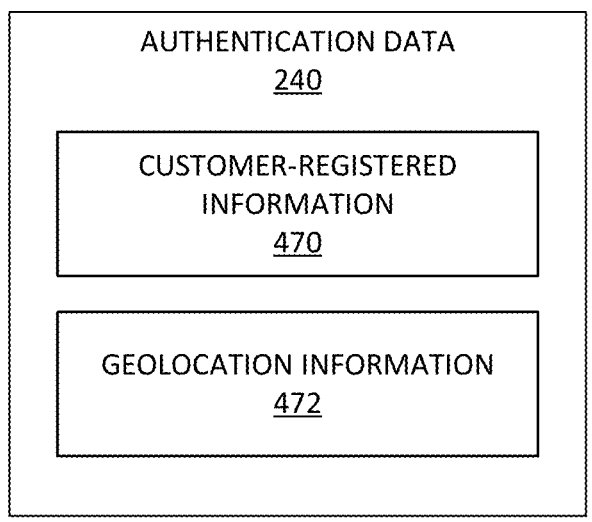
FIG. 11 illustrates an example authentication data.

FIG. 11 illustrates an example authentication data 240. In some embodiments, the authentication data 240 includes customer-registered information 470 and geolocation information 472. The authentication data 240 is used to verify the customer 106 and/or the data reading device 130 is what the customer 106 and/or the data reading device 130 claims to be.

The customer-registered information 470 is information provided by the customer 106 to identify the customer 106. The customer-registered information 470 can be registered in the customer service computing device 114 of the enterprise 102. For example, when the customer 106 creates an account (e.g., a bank account), the enterprise 102 (e.g., a bank) requests a variety of personal information of the customer 106 and record the information in the enterprise's system (e.g., the customer service computing device 114). The personal information is used to verify the customer 106 and the account associated with the customer 106. Examples of the customer-registered information 470 include a customer's name, a customer's address, a customer's social security number, a customer's identification card number (e.g., a driver's license number), login information, such as a user ID and password, set by the customer 106, one or more identifiers of the data reading device 130, and other information suitable for identifying the customer 106 and the goods or service associated with the customer 106. The identifiers of the data reading device 130 include a unique device identification (UUID) number associated with the data reading device 130 (e.g., a mobile device). In some embodiments, the UUID can have a device fingerprint based on, for example, geolocation attributes, connection attributes (i.e., a value indicating whether the connection is through a dedicated network connection or the general Internet), timing and time zone attributes (e.g., how many connection attempts were made, what the time lapse was between attempts, and when the attempts took place), network routing attributes (e.g., how the system's traffic is routed), application attributes (how the application is accessing the website), and operating system attributes (e.g., OS, browser, other system identifiers).

The geolocation information 472 is information about a location of the customer's premises or whereabouts. For example, the geolocation information 472 can include an address to which the customer service document 110 is delivered. The customer 106 can provide the address, at which the customer 106 wants to receive the customer service document 110, when the customer 106 creates a new account with the enterprise 102 or updates some or all of the customer information registered with the enterprise 102.

As described herein, the authentication data 240 including the customer-registered information 470 and the geolocation information 472 are stored in the data storage device 146 of the customer service document 110 before the customer service document 110 is delivered to the customer 106.

In some embodiments, the customer-registered information 470 can be transferred to the data reading device 130 and stored in the data reading device 130 to be used as at least portion of reference authentication data 490 (FIG. 13) for authentication processes.

Figure 12:
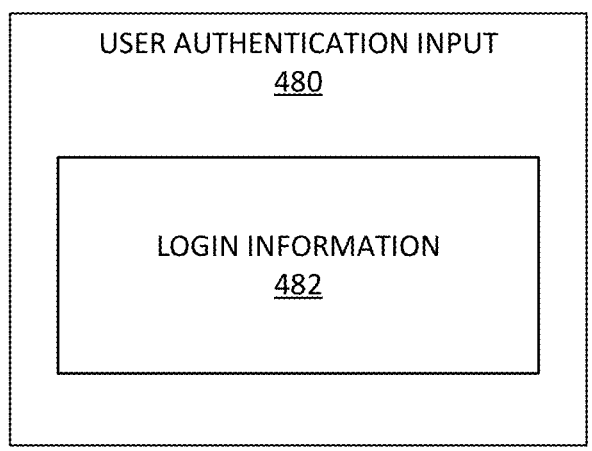
FIG. 12 illustrates an example user authentication input.

FIG. 12 illustrates an example user authentication input 480. In some embodiments, the user authentication input 480 includes login information 482.

The login information 482 is information entered by the customer 106 through the data reading device 130. The login information 482 is used to authenticate the data reading device 130 and/or the customer 106. For examples, when a wireless connection is established between the data reading device 130 and the data storage device 146, the data reading device 130 can operate to prompt the customer 106 to provide the login information 482 so that the data reading device 130 uses the login information 482 to authenticate the customer 106 and/or the data reading device 130 before data stored in the data storage device 146 is shared with the customer 106.

The login information 482 is pre-registered by the customer 106. For example, the customer 106 can set up the login information 482 when the customer 106 creates a new bank account with a bank (i.e., the enterprise 102). Examples of the login information 482 include a user ID and password, one or more security questions and answers, a security code or number, fingerprints, and other information suitable for authentication process.

As described above, the user authentication input 480 can be consolidated with the authentication data 240 to become a first authentication data to be compared with reference authentication data in authentication processes. In other embodiments, however, the user authentication input 480 can be consolidated with the reference authentication data 490 to become a second authentication data to be compared with the authentication data 240 in authentication processes.

Figure 13:
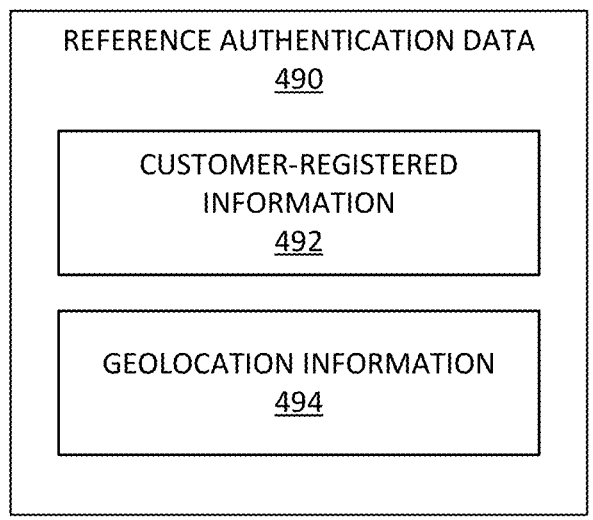
FIG. 13 illustrates example reference authentication data.

FIG. 13 illustrates example reference authentication data 490. In some embodiments, the reference authentication data 490 include customer-registered information 492 and geolocation information 494.

In some embodiments, the reference authentication data 490 include all pieces of information corresponding to the authentication data 240 and the user authentication input 480. As described herein, for authentication of the data reading device 130 and/or the customer 106, at least some of items contained in the reference authentication data 490 are compared with corresponding items contained in a combination of the authentication data 240 and the user authentication input 480 (i.e., the first authentication data).

The reference authentication data 490 can be obtained from a database system of the enterprise 102 (e.g., the customer service computing device 114). The data reading device 130 can receive the reference authentication data 490 from the enterprise's database system and store the data 490 for authentication processes. In some embodiments, the data reading device 130 stores the reference authentication data 490 prior to the authentication processes. In other embodiments, the data reading device 130 can access the enterprise's database system to retrieve the reference authentication data 490 in real time when the authentication processes are performed.

The customer-registered information 492 includes items corresponding to those contained in the customer-registered information 470 of the authentication data 240. As such, examples of the customer-registered information 470 include a customer's name, a customer's address, a customer's social security number, a customer's identification card number (e.g., a driver's license number), login information, such as a user ID and password, set by the customer 106, one or more identifiers of the data reading device 130, and other information suitable for identifying the customer 106 and the goods or service associated with the customer 106.

The geolocation information 494 is information about a location of the customer 106 using the data reading device 130. In some embodiments, the geolocation information 494 is obtained by the location identification device 348 (e.g., a GPS unit or an IP address) of the data reading device 130. The geolocation information 494 obtained by the data reading device 130 is compared with the geolocation information 472 transferred from the data storage device 146 to authenticate the data reading device 130 with respect to the data storage device 146 (i.e., to verify that the customer service document 110 is delivered to an intended address, and that the data storage device 146 is in communication with an intended data reading device 130).

Figure 14:
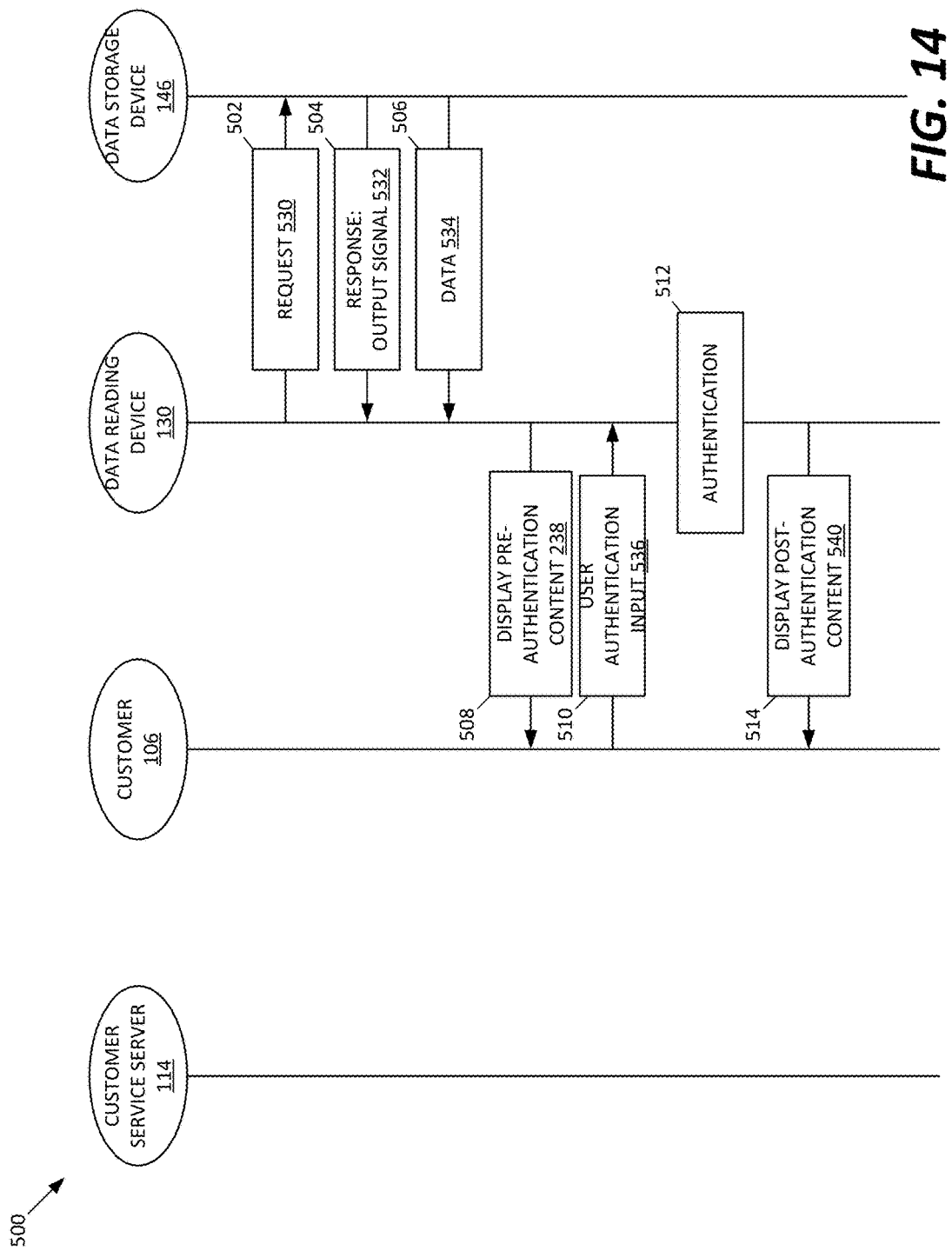
FIG. 14 illustrates an example method of operating the data transfer system of FIG. 2.

Referring to FIGS. 14-16, example methods of operating the data transfer system 140 are illustrated and described in detail. In some embodiments, the customer service document 110 delivered to the customer 106 is a financial statement, such as a bank statement and a payment card statement (e.g., a credit card statement and a debit card statement). A financial statement is a formal record of financial activities of the customer 106 with the enterprise 102. The customer service document 110 is designed to present financial information relevant to the customer 106 in various manners. The customer service document 110 can include an account summary (e.g., account names, account numbers, beginning balances, a total of deposits/credits, a total of withdrawals, a total of checks paid, and ending balances), detailed information on each activities (e.g., deposits/credits, withdrawals, and checks paid), notices relating to accounts, and other account-related information. The customer service document 110 can further include promotional information together with the financial information.

FIG. 14 illustrates an example method 500 of operating the data transfer system 140. In some embodiments, the method 500 includes operations 502, 504, 506, 508, 510, 512, and 514.

At the operation 502, the data reading device 130 sends a request 530 for wireless connection to the data storage device 146. In some embodiments, the wireless connection is established with a RF communication. When the data storage device 146 is located within a range of electromagnetic field produced by the data reading device 130, the electromagnetic field can be regarded as the request 530 for wireless connection from the data reading device 130.

At the operation 504, the data storage device 146 sends a response to the data reading device 130 in replay of the request 530. In some embodiments, the data storage device 146 can be powered by electromagnetic induction from the electromagnetic field produced by the data reading device 130 and then generate an output signal 532 in response to the request 530. The output signal 532 is transferred to the data reading device 130 to establish wireless connection between the data reading device 130 and the data storage device 146.

At the operation 506, the data storage device 146 transfers stored data 534 to the data reading device 130. In some embodiments, the data storage device 146 can transfer all data stored therein to the data reading device 130. In other embodiments, the data storage device 146 can send a portion of data stored therein to the data reading device 130.

In some embodiments, the stored data 534 include the data 236 (FIG. 5). As illustrated in FIG. 5, the stored data 236 can include the pre-authentication data 238, the authentication data 240, and/or the customer-related information 242.

In some embodiments, the operations 504 and 506 can be combined as a single operation. For example, the output signal 532 can include the data 534 so that the data 534 are sent to the data reading device 130 along with the other portion of the output signal 532 for establishing wireless connection.

At the operation 508, the data reading device 130 operates to display the pre-authentication data 238 (or information retrieved based upon the pre-authentication data 238) via a display screen of the device 130 so that the customer 106 sees and interacts with the data reading device 130. In some embodiments, the operation 508 can be performed by the user interaction engine 402 of the data reading device 130.

At the operation 510, the data reading device 130 operates to receive the user authentication input 536 that is entered by the customer 106 via the device 130.

At the operation 512, the data reading device 130 performs one or more authentication for the data reading device 130. The authentication of the data reading device 130 is performed to verify that the data reading device 130 is a device that is authorized to use the data 534 provided by the data storage device 146. In some embodiments, the data reading device 130 executes the authentication process (i.e., the method 450) as illustrated in FIG. 10.

At the operation 514, the data reading device 130 operates to display post-authentication content 540 via the display screen of the device 130. In some embodiments, the post-authentication content 540 includes the customer-related information 242 as illustrated in FIG. 5.

In the illustrated example of FIG. 14, the method 500 of operating the data transfer system 140 does not involve a communication with the customer service computing device 114 of the enterprise 102. The data transfer, authentication, and other processes are locally performed between the data storage device 146 and the data reading device 130 operated by the customer 106.

FIG. 15 illustrates another example method 550 of operating the data transfer system 140. The method 550 is similar to the method 500 except that data stored in the data storage device 146 can be transferred in a plurality of steps, instead of being transferred entirely in a single step as illustrated in FIG. 14. In some embodiments, the method 550 includes operations 552, 554, 556, 558, 560, 562, 564, 566, 568, 570, and 572.

The operations 552 and 554 are performed similarly to the operations 502 and 504. The details of the operations 552 and 554 are not repeated for brevity purposes.

At the operation 556, the data storage device 146 transfers the pre-authentication data 238 to the data reading device 130.

At the operation 558, the data reading device 130 operates to display the pre-authentication data 238 (or information retrieved based upon the pre-authentication data 238) via a display screen of the device 130 so that the customer 106 sees and interacts with the data reading device 130. In some embodiments, the operation 508 can be performed by the user interaction engine 402 of the data reading device 130.

At the operation 560, the data reading device 130 operates to receive the user authentication input 536 that is entered by the customer 106 via the device 130.

At the operation 562, the data reading device 130 can optionally operate to send a request 580 for authentication data 240 to the data storage device 146.

At the operation 564, the data reading device 130 receives the authentication data 240 from the data storage device 146. In some embodiments, the operation 564 can be performed in response to the request 580 at the operation 562. In other embodiments, the operation 564 can be performed without the request 580 from the data reading device 130.

At the operation 566, the data reading device 130 performs authentication for the data reading device 130. The authentication of the data reading device 130 is performed to verify that the data reading device 130 is a device that is authorized to use the data 534 provided by the data storage device 146. In some embodiments, the data reading device 130 executes the authentication process (i.e., the method 450) as illustrated in FIG. 10.

At the operation 568, the data reading device 130 can optionally operate to send a request 582 for post-authentication content 540 to the data storage device 146.

At the operation 570, the data reading device 130 receives the post-authentication content 540 from the data storage device 146. As described above, the post-authentication content 540 can include the customer-related information 242 as illustrated in FIG. 5.

At the operation 572, the data reading device 130 operates to display the post-authentication content 540 via the display screen of the device 130.

Similarly to the method 500, the method 550 of operating the data transfer system 140 does not involve a communication with the customer service computing device 114 of the enterprise 102. The data transfer, authentication, and other processes are locally performed between the data storage device 146 and the data reading device 130 operated by the customer 106.

FIG. 16 illustrates yet another example method 600 of operating the data transfer system 140. The method 600 is similar to the method 550, but performs an authentication process with the customer service computing device 114. In some embodiments, the method 600 includes operations 602, 604, 606, 608, 610, 612, 614, 616, 618, 620, 622, 624, and 626.

The operations 602, 604, 606, 608, 610, 612, and 614 are performed similarly to the operations 552, 554, 556, 558, 560, 562, and 564. The details of the operations 602, 604, 606, 608, 610, 612, and 614 are not repeated for brevity purposes.

At the operation 616, the data reading device 130 sends a request 630 for authentication process to the customer service computing device 114 via the data communication network 124.

At the operation 618, the customer service computing device 114 performs authentication for the data reading device 130. In some embodiments, the authentication process executed by the customer service computing device 114 is similar to the authentication process (i.e., the method 450) as illustrated in FIG. 10. However, the customer service computing device 114 retrieves reference authentication data 490 from its own database, rather than from the data reading device 130.

At the operation 620, the customer service computing device 114 sends a response to the data reading device 130, confirming that the data reading device 130 has been authenticated.

Once the data reading device 130 receives the response from the customer service computing device 114 at the operation 620, the subsequent operations 622, 624, and 626 are performed similarly to the operation 568, 570, and 572, as illustrated in FIG. 15.

In other embodiments, the operations 606, 612, 614, 622, and 624 are replaced by an operation similar to the operation 506 as illustrated in FIG. 14. For example, in such other embodiments, the data storage device 146 can transfer all of the pre-authentication data 238, the authentication data 240, and the post-authentication content 540 (e.g., the customer-related information 242) to the data reading device 130 at the same time. Further, the operation similar to the operation 506 can also be combined with the operation 604 to be a single operation. For example, the output signal 532 can include the pre-authentication data 238, the authentication data 240, and the post-authentication content 540 (e.g., the customer-related information 242) so that all of the data are sent to the data reading device 130 along with the other portion of the output signal 532 for establishing wireless connection.

FIG. 17 illustrates another example operation of the data transfer system 140. In this example, the customer service document 110 delivered to the customer 106 is a letter for delivering a payment card (e.g., a credit card or a debit card) that is inactive.

The customer service document 110 is configured similarly to that illustrated in FIG. 2 except for a payment card 700 accompanied with the printable medium 142. Thus, the details of the customer service document 110 in this example are not repeated for brevity purposes.

The data transfer system 140 in this example is also operated similarly to those illustrated above. For example, once the data reading device 130 and/or the customer 106 are authenticated as described herein, the data reading device 130 can send activation information to the customer service computing device 114 so that the customer service computing device 114 activates a payment card delivered with the customer service document 110 to the customer 106. In some embodiments, the customer-related information 242 can include an activation command configured to be sent to the customer service computing device 114 of the enterprise 102 via the data communication network 124 so that the customer service computing device 114 completes the activation of the payment card 700. For example, the customer-related information 242 for activation processes can include information about the customer 106, a financial account associated with the payment card, and other information identifying the payment card and the customer 106, such as account number, social security number, serial number on the back, telephone, and zip code.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of receiving customer service information via a customer service document, the method comprising:

establishing short-range communication between a mobile computing device and an electrical data storage device of the customer service document when the mobile computing device is located within a predetermined distance from the customer service document, the data storage device being included in the customer service document and containing customer service data, with the customer service document being a financial statement including financial data printed thereon summarizing a plurality of transactions, and the customer service data on the data storage device being financial information that supplements the financial data printed on the financial statement;

receiving at least a portion of the customer service data from the data storage device of the customer service document;

authenticating the mobile computing device with authentication data locally at the mobile computing device, the authentication data included in the customer service data; and displaying the financial information on a display of the mobile computing device when the mobile computing device is authenticated with the authentication data.

2. The method of claim 1, wherein authenticating the mobile computing device comprises:

receiving, using the mobile computing device, first authentication data from the data storage device of the customer service document;

retrieving second authentication data from the mobile computing device;

comparing the first authentication data with the second authentication data; and verifying a relationship between the first authentication data and the second authentication data.

3. The method of claim 2, wherein authenticating the mobile computing device further comprises:

receiving, using the mobile computing device, user authentication input from the customer, the user authentication input being combined with the second authentication data such that the combination of the second authentication data and the user authentication input is compared with the first authentication data.

4. The method of claim 2, wherein authenticating the mobile computing device further comprises:

receiving, using the mobile computing device, user authentication input from the customer, the user authentication input being combined with the first authentication data such that the combination of the first authentication data and the user authentication input is compared with the second authentication data.

5. The method of claim 1, further comprising:

prior to authenticating the mobile computing device, receiving a pre-authentication data from the data storage device of the customer service document; and displaying information associated with the pre-authentication data on the mobile computing device.

6. The method of claim 2, further comprising:

determining when the first authentication data does not match the second authentication data, and upon determining that the first authentication data does not match the second authentication data, receiving, using the mobile computing device, additional authentication input from the customer.

7. The method of claim 2, further comprising:

determining when the first authentication data does not match the second authentication data, and upon determining that the first authentication data does not match the second authentication data, sending a request to an authority computing device, the request for authenticating the mobile computing device.

8. The method of claim 1, wherein the first authentication data include first customer-registered information and first geolocation information, the customer-registered information configured to identify the mobile computing device and/or the customer, and the first geolocation information including a mailing address of the customer.

9. The method of claim 8, wherein the first customer-registered information includes at least one of a customer's name, a customer's address, a customer's social security number, a customer's identification card number, login information, such as a user ID and password, and one or more identifiers of the mobile computing device.

10. The method of claim 8, wherein the second authentication data includes second customer-registered information and second geolocation information, the second customer-registered information corresponding to the first customer-registered information.

11. The method of claim 10, wherein the second geolocation information is obtained by a location identification device of the mobile computing device.

12. The method of claim 1, wherein the at least a portion of the customer service data is used to display promotional information to the customer.

13. The method of claim 1, wherein the customer service document is a letter accompanying a payment card that is inactive.

14. The method of claim 13, wherein performing, using the mobile computing device, a predetermined task using the at least a portion of the customer service data comprises: sending a request to an authority computing device to activate the payment card.

* * * * *